United States Patent
Park et al.

(10) Patent No.: US 10,672,816 B2
(45) Date of Patent: *Jun. 2, 2020

(54) OPTICAL SENSORS INCLUDING A LIGHT-IMPEDING PATTERN

(71) Applicant: Samsung Electronics Co., Ltd., Suwon-si, Gyeonggi-do (KR)

(72) Inventors: Jonghoon Park, Seoul (KR); BumSuk Kim, Hwaseong-si (KR); Jung-Saeng Kim, Seoul (KR); Min Jang, Haseong-si (KR); Taesub Jung, Hwaseong-si (KR); Hyukjin Jung, Hwaseong-si (KR); Dongmin Keum, Daegu (KR); Changrok Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,482

(22) Filed: Jul. 23, 2019

(65) Prior Publication Data

US 2019/0348457 A1 Nov. 14, 2019

Related U.S. Application Data

(63) Continuation of application No. 15/954,818, filed on Apr. 17, 2018.

(30) Foreign Application Priority Data

Apr. 17, 2017 (KR) .................. 10-2017-0049219

(51) Int. Cl.
*H01L 27/32* (2006.01)
*H01L 27/146* (2006.01)
(Continued)

(52) U.S. Cl.
CPC ........ *H01L 27/14627* (2013.01); *G06F 21/32* (2013.01); *G06K 9/0004* (2013.01);
(Continued)

(58) Field of Classification Search
CPC combination set(s) only.
See application file for complete search history.

(56) References Cited

U.S. PATENT DOCUMENTS 7,564,113 B2   7/2009   Nakashiba
7,842,980 B2   11/2010  Park
(Continued)

FOREIGN PATENT DOCUMENTS

KR   20060077064   7/2006
KR   20060078059   7/2006
(Continued)

*Primary Examiner* — Robert G Bachner
(74) *Attorney, Agent, or Firm* — Myers Bigel, P.A.

(57) ABSTRACT

Optical sensors including a light-impeding pattern are provided. The optical sensors may include a plurality of photoelectric conversion regions, a plurality of lenses on the plurality of photoelectric conversion regions, and a light-impeding layer extending between the plurality of photoelectric conversion regions and the plurality of lenses. The light-impeding layer may include an opening between a first one of the plurality of photoelectric conversion regions and a first one of the plurality of lenses. The optical sensors may be configured to be assembled with a display panel such that the plurality of lenses are disposed between the light-impeding layer and the display panel.

18 Claims, 19 Drawing Sheets

(51) Int. Cl.
  *G06K 9/00* (2006.01)
  *G06F 21/32* (2013.01)
  *H04N 5/374* (2011.01)

(52) U.S. Cl.
  CPC .... *H01L 27/1463* (2013.01); *H01L 27/14623* (2013.01); *H01L 27/14629* (2013.01); *H01L 27/14645* (2013.01); *H01L 27/14685* (2013.01); *H01L 27/3234* (2013.01); *H01L 27/14612* (2013.01); *H01L 27/14621* (2013.01); *H01L 27/14636* (2013.01); *H01L 27/323* (2013.01); *H04N 5/374* (2013.01)

(56) References Cited

U.S. PATENT DOCUMENTS

| | | |
|---|---|---|
| 9,184,197 B2 | 11/2015 | Kusaka |
| 2009/0190074 A1 | 7/2009 | Woo et al. |
| 2012/0211850 A1 | 8/2012 | Kuboi |
| 2012/0242884 A1* | 9/2012 | Ishiguro ............ H01L 27/14623 348/340 |
| 2016/0064430 A1 | 3/2016 | Lee et al. |
| 2016/0211306 A1* | 7/2016 | Choi ................. H01L 27/14638 |
| 2017/0161543 A1 | 6/2017 | Smith et al. |
| 2017/0220838 A1* | 8/2017 | He ....................... G06K 9/0004 |
| 2018/0233531 A1 | 8/2018 | Huang et al. |

FOREIGN PATENT DOCUMENTS

| | | |
|---|---|---|
| KR | 20110079336 | 7/2011 |
| KR | 20100076222 | 8/2014 |
| WO | 2015149545 | 10/2015 |

* cited by examiner

OPTICAL SENSORS INCLUDING A LIGHT-IMPEDING PATTERN

CROSS-REFERENCE TO RELATED APPLICATIONS

This U.S. non-provisional patent application is a continuation of U.S. patent application Ser. No. 15/954,818, filed Apr. 17, 2018, which claims priority under 35 U.S.C. § 119 to Korean Patent Application No. 10-2017-0049219, filed on Apr. 17, 2017, in the Korean Intellectual Property Office, the disclosure of which is hereby incorporated by reference herein in its entirety.

BACKGROUND

The present disclosure relates to the field of electronics and, more particularly, to optical sensors.

An optical sensor is a semiconductor device that converts optical images into electrical signals. As the computer and communications industries have developed, demand has increased for high-performance optical sensors in a variety of applications, including digital cameras, camcorders, personal communication systems, gaming machines, security cameras, micro-cameras for medical applications, and/or robots. Accordingly, there is an increased demand for high-performance imaging devices or high-performance optical sensors.

One problem for optical sensors, however, is image blur. For example, image blur may occur when an optical sensor is close to an object that is to be imaged. As a result, the quality of images that are taken in close proximity to an object may be undesirably low.

SUMMARY

Some embodiments of the inventive concepts provide an optical sensor including a pixel structure, which is configured to selectively collect light to be incident at a desired incident angle.

Some embodiments of the inventive concepts provide an optical sensor which is used to easily take an image of a near object.

According to some embodiments of the inventive concepts, an image sensor may include a substrate including a plurality of pixels, a device isolation pattern provided on borders between the plurality of pixels, the device isolation pattern penetrating at least a portion of the substrate and having a first width between an adjacent pair of the pixels, micro lenses provided on a surface of the substrate, and a grid pattern provided between the substrate and an array of the micro lenses and overlapped with the plurality of pixels and the device isolation pattern. The grid pattern may include a plurality of openings penetrating the same, and each of the plurality of openings may be overlapped with a corresponding one of the plurality of pixels, when viewed in a plan view parallel to the surface of the substrate. The grid pattern may have a second width which corresponds to a distance between an adjacent pair of the plurality of openings and is larger than the first width.

According to some embodiments of the inventive concepts, an image sensor may include a substrate including at least a pair of pixels, a device isolation pattern provided on a border between the pair of the pixels to penetrate at least a portion of the substrate, and a grid pattern provided on a surface of the substrate and overlapped with the device isolation pattern when viewed in a plan view parallel to the surface of the substrate. The device isolation pattern may have a first width that is smaller a second width of the grid pattern, and the first width and the second width may be distances measured in a direction parallel to the surface of the substrate. According to some embodiments of the inventive concepts, an image sensor may include a substrate including a plurality of pixels, a device isolation pattern provided on borders between the plurality of pixels, the device isolation pattern penetrating at least a portion of the substrate and having a first width between an adjacent pair of the plurality of pixels, micro lenses provided on the plurality of pixels, respectively, the micro lenses being connected to each other by a flat portion provided therebetween, and a grid pattern provided between the substrate and an array of the micro lenses, the grid pattern including a plurality of openings which are provided to penetrate the same and are vertically overlapped with the plurality of pixels, respectively. The grid pattern may have a second width corresponding to a distance between an adjacent pair of the plurality of openings, the flat portion may have a third width corresponding to a distance between an adjacent pair of the micro lenses, and the third width may be greater than the first width and may be smaller than the second width.

According to some embodiments of the inventive concepts, an optical sensor of an optical scanner may include a plurality of photoelectric conversion regions, a plurality of lenses on the plurality of photoelectric conversion regions, and a light-impeding layer extending between the plurality of photoelectric conversion regions and the plurality of lenses. The light-impeding layer may include an opening between a first one of the plurality of photoelectric conversion regions and a first one of the plurality of lenses. The optical sensor may be configured to be assembled with a display panel such that the plurality of lenses are disposed between the light-impeding layer and the display panel.

According to some embodiments of the inventive concepts, an optical sensor of an optical scanner may include a plurality of photoelectric conversion regions, a plurality of lenses on the plurality of photoelectric conversion regions, which are arranged along a first direction, and a light-impeding layer extending between the plurality of photoelectric conversion regions and the plurality of lenses. The light-impeding layer may include an opening between a first one of the plurality of photoelectric conversion regions and a first one of the plurality of lenses. A ratio of a widest width of the opening in the first direction to a widest width of the first one of the plurality of lenses in the first direction may be at least about 1:2.

According to some embodiments of the inventive concepts, an optical sensor of an optical scanner may include a plurality of photoelectric conversion regions, a plurality of lenses on the plurality of photoelectric conversion regions, and a light-impeding layer extending between the plurality of photoelectric conversion regions and the plurality of lenses. The light-impeding layer may include an opening between a first one of the plurality of photoelectric conversion regions and a first one of the plurality of lenses. The light-impeding layer may be configured to reflect or absorb light incident on the light-impeding layer such that the light is selectively incident on the first one of the plurality of photoelectric conversion regions through the opening. A magnitude of a first signal generated by the first one of the plurality of photoelectric conversion regions in response to a first portion of the light, which is incident at a substantially right angle on the first one of the plurality of photoelectric conversion regions, may be about twice a magnitude of a second signal generated by the first one of the plurality of photoelectric conversion regions in response to a second portion of the light, which has an angle relative to the first portion of the light of about 2.5 degrees.

BRIEF DESCRIPTION OF THE DRAWINGS

Example embodiments will be more clearly understood from the following description taken in conjunction with the accompanying drawings. The accompanying drawings represent non-limiting, example embodiments as described herein.

It should be noted that these figures are intended to illustrate the general characteristics of methods, devices, and/or materials utilized in example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. As used herein the term "and/or" includes any and all combinations of one or more of the associated listed items. It will be understood that an optical sensor may also be referred to herein as an "image sensor" (e.g., CMOS image sensor), and an optical sensor may be included in an optical scanner (e.g., a fingerprint scanner).

Figure 1:
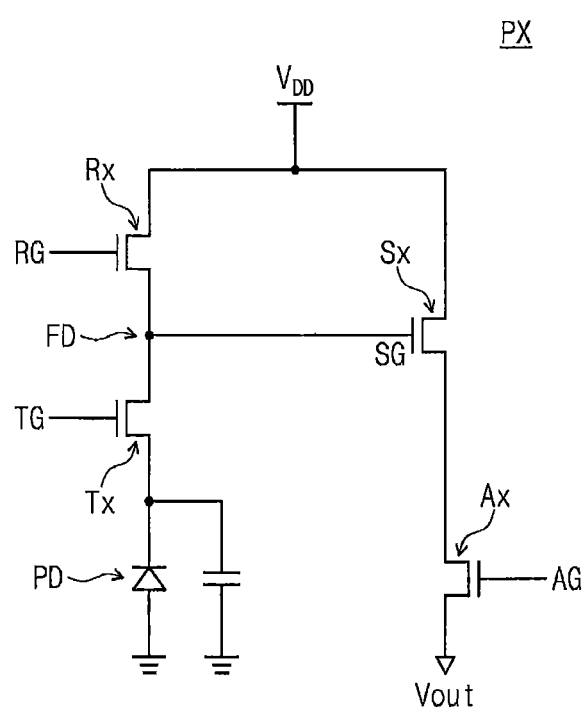
FIG. 1 is a circuit diagram of a pixel of an image sensor according to some embodiments of the inventive concepts.

FIG. 1 is a circuit diagram of a pixel of an image sensor according to some embodiments of the inventive concepts.

Referring to FIG. 1, an image sensor may include a plurality of pixels PX, each of which include a photoelectric conversion region PD, a transfer transistor Tx, a source follower transistor Sx, a reset transistor Rx, and a selection transistor Ax. The transfer transistor Tx, the source follower transistor Sx, the reset transistor Rx, and the selection transistor Ax may include a transfer gate TG, a source follower gate SG, a reset gate RG, and a selection gate AG, respectively.

The photoelectric conversion region PD may be, for example, a photodiode including an n-type impurity region and a p-type impurity region. A floating diffusion region FD may serve as a drain electrode of the transfer transistor Tx. The floating diffusion region FD may serve as a source electrode of the reset transistor Rx. The floating diffusion region FD may be electrically connected to the source follower gate SG of the source follower transistor Sx. The source follower transistor Sx may be connected to the selection transistor Ax.

Hereinafter, an operation of an image sensor according to some embodiments of the inventive concepts will be described with reference to FIG. 1. Firstly, in order to discharge electric charges from the floating diffusion region FD in a light-blocking state, a power voltage $V_{DD}$ may be applied to drain electrodes of the reset and source follower transistors Rx and Sx, and the reset transistor Rx may be turned on. Thereafter, if the reset transistor Rx is turned-off and an external light is incident into the photoelectric conversion region PD, electron-hole pairs may be generated in the photoelectric conversion region PD. Holes may be moved toward and accumulated in the p-type impurity region of the photoelectric conversion region PD, and electrons may be moved toward and accumulated in the n-type impurity region of the photoelectric conversion region PD. If the transfer transistor Tx is turned on, the electric charges (i.e., electrons and holes) may be transferred to and accumulated in the floating diffusion region FD. A change in amount of the accumulated electric charges may lead to a change in gate bias of the source follower transistor Sx, and this may lead to a change in source potential of the source follower transistor Sx. Accordingly, if the selection transistor Ax is turned on, an amount of the electric charges may be read out as a signal (e.g., Vout) to be transmitted through a column line. Signals (e.g., Vout) output from the pixels PX are processed to generate an image of an object that is to be imaged.

Although the pixel of FIG. 1 is illustrated to have a single photoelectric conversion region PD and four transistors (i.e., Tx Rx, Ax, and Sx), the inventive concepts are not limited thereto. For example, the image sensor may include a plurality of pixels PX, and in some embodiments, the reset transistor Rx, the source follower transistor Sx, or the selection transistor Ax may be shared by adjacent ones of the pixels PX. This may make it possible to increase an integration density of the image sensor.

Figure 2:
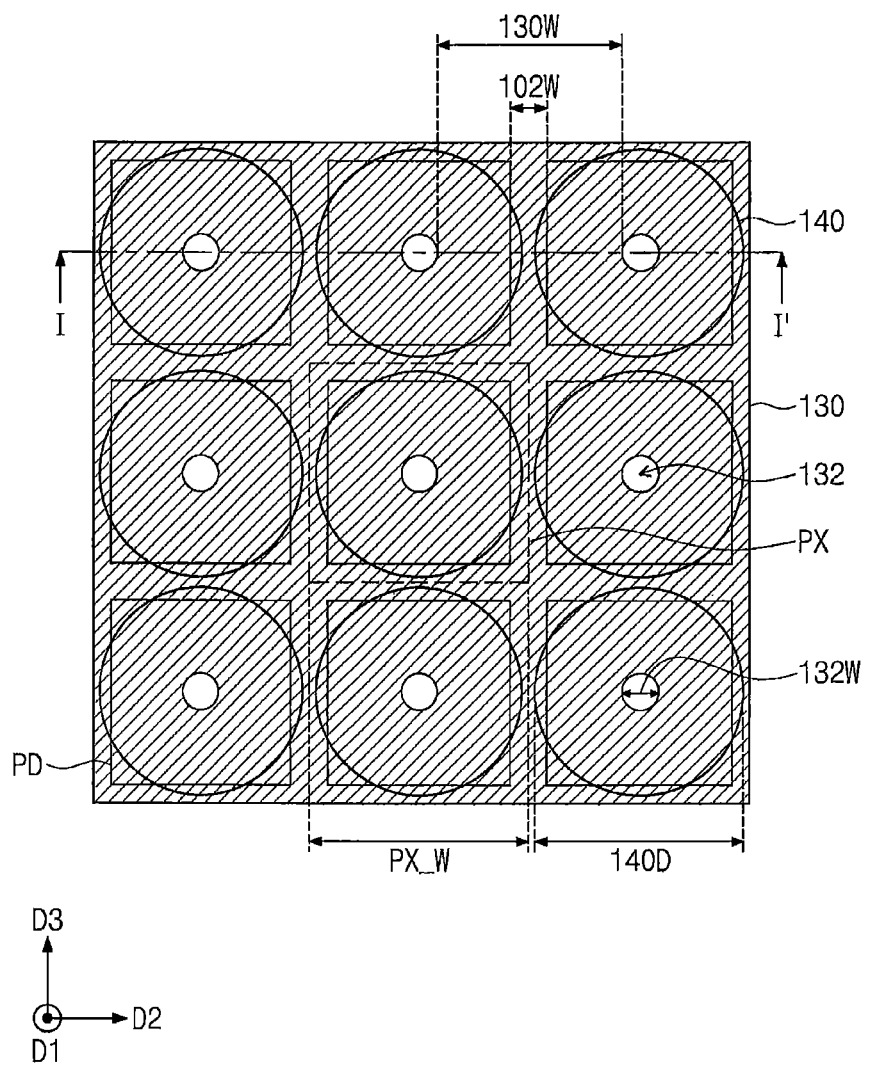
FIG. 2 is a plan view of an image sensor according to some embodiments of the inventive concepts.
Figure 3:
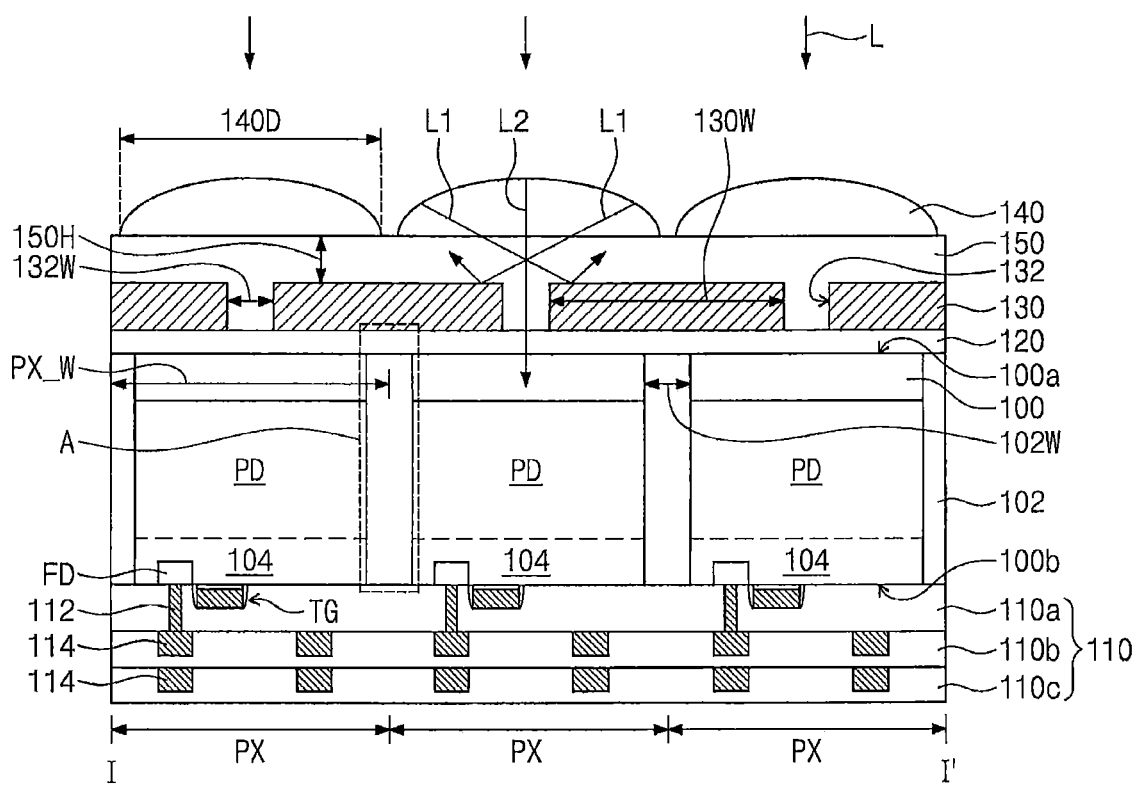
FIG. 3 is a sectional view taken along the line I-I' of FIG. 2.
Figure 3:
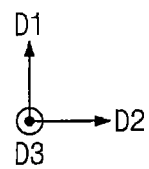

FIG. 2 is a plan view of an image sensor according to some embodiments of the inventive concepts, and FIG. 3 is a sectional view taken along the line I-I' of FIG. 2.

Referring to FIGS. 2 and 3, a substrate 100 including a plurality of pixels PX may be provided. A device isolation pattern 102 may be provided in the substrate 100, and here, the device isolation pattern 102 may be provided along borders between (e.g., border regions of) the pixels PX and may penetrate at least a portion of the substrate 100. The substrate 100 may be, for example, a semiconductor substrate (e.g., a silicon wafer, a germanium wafer, a silicon-germanium wafer, a II-VI compound semiconductor wafer, or a III-V compound semiconductor wafer) or a silicon-on-insulator (SOI) wafer. The device isolation pattern 102 may have a top surface that is coplanar with, or adjacent to, a first surface 100a of the substrate 100. The device isolation pattern 102 may have a bottom surface that is coplanar with, or adjacent to, a second surface 100b of the substrate 100. The first and second surfaces 100a and 100b may be two opposing surfaces of the substrate 100 spaced apart from each other in a first direction D1 that is normal (i.e., perpendicular) to the first surface 100a. In some embodiments, all of the plurality of pixels PX (i.e., nine pixels) of FIG. 2 output signals that are processed to generate an image of an object that is to be imaged.

A photoelectric conversion region PD may be provided in each of the pixels PX. The photoelectric conversion region PD may be an impurity region that is doped to have a first conductivity type. For example, the photoelectric conversion region PD may contain n-type impurities (e.g., phosphorus, arsenic, bismuth, and/or antimony). A well region 104 may be provided in each of the pixels PX. The well region 104 may be an impurity region that is doped to have a second conductivity type different from the first conductivity type. For example, the well region 104 may contain p-type impurities (e.g., aluminum (Al), boron (B), indium (In) and/or gallium (Ga)). The well region 104 may be provided adjacent to the second surface 100b of the substrate 100, and the photoelectric conversion region PD may be spaced apart from the second surface 100b of the substrate 100 with the well region 104 interposed therebetween. A floating diffusion region FD may be provided in each of the pixels PX. The floating diffusion region FD may be provided adjacent to the second surface 100b of the substrate 100. The floating diffusion region FD may be provided in the well region 104 and may be an impurity region whose conductivity type is different from that of the well region 104. For example, the floating diffusion region FD may be an impurity region having the first conductivity type (e.g., containing n-type impurities).

Transfer gates TG may be provided on the second surface 100b of the substrate 100. The transfer gates TG may be provided on the plurality of pixels PX, respectively. Each of the transfer gates TG may be provided adjacent to the floating diffusion region FD of a corresponding one of the pixels PX.

An interconnection structure 110 may be provided on the second surface 100b of the substrate 100. The interconnection structure 110 may include a first interlayer insulating layer 110a, a second interlayer insulating layer 110b, and a third interlayer insulating layer 110c which are sequentially stacked on the second surface 100b of the substrate 100. The first interlayer insulating layer 110a may be provided to be in contact with the second surface 100b of the substrate 100 and to extend on (e.g., cover) the transfer gates TG. The interconnection structure 110 may further include via plugs 112, which are provided to penetrate the first interlayer insulating layer 110a, and interconnection lines 114, which are provided in the second and third interlayer insulating layers 110b and 110c. Each of the via plugs 112 may be connected to the floating diffusion region FD of a corresponding one of the pixels PX and may be connected to a corresponding one of the interconnection lines 114.

An anti-reflection layer 120 may be provided on the first surface 100a of the substrate 100. The anti-reflection layer 120 may be spaced apart from the interconnection structure 110 with the substrate 100 interposed therebetween. The anti-reflection layer 120 may be provided to extend on (e.g., cover) the plurality of pixels PX and the device isolation pattern 102. The anti-reflection layer 120 may impede/prevent light L from being reflected by the first surface 100a of the substrate 100, thereby allowing the light L to be effectively incident into the photoelectric conversion region PD. The anti-reflection layer 120 will be described in more detail with reference to FIGS. 13A and 13B.

A grid pattern 130 may be provided on the first surface 100a of the substrate 100. The grid pattern 130 may also be referred to herein as a "light-impeding pattern," as it may reflect, block, or otherwise impede oblique light L1 from passing to a photoelectric conversion region PD. In some embodiments, the grid pattern 130 may be referred to herein as a "light-reflecting pattern" or a "light-blocking pattern" when it reflects or blocks, respectively, oblique light L1. The anti-reflection layer 120 may be provided between the substrate 100 and the grid pattern 130. The grid pattern 130 may overlap the plurality of pixels PX and the device isolation pattern 102, when viewed in a plan view, and hereinafter, the plan view refer to a plane perpendicular to the first direction D1. The grid pattern 130 may have a plurality of openings 132, which are provided to penetrate (e.g., to extend completely through) the grid pattern 130. For example, each of the openings 132 may extend through an upper surface and a lower surface of the grid pattern 130. Each of the openings 132 may be provided to expose a top surface of the anti-reflection layer 120. The plurality of openings 132 may be formed on the plurality of pixels PX, respectively, and may be spaced apart from each other in a direction parallel to the first surface 100a of the substrate 100. As an example, when viewed in a plan view, the plurality of pixels PX may be two-dimensionally arranged in a second direction D2 and a third direction D3, as illustrated in FIG. 2. The second direction D2 and the third direction D3 may be parallel to the first surface 100a of the substrate 100 and may traverse (e.g. cross) each other. The second direction D2 and the third direction D3 may be perpendicular to the first direction D1. In this case, the plurality of openings 132 may be spaced apart from each other in both of the second and third directions D2 and D3 and may be formed on the plurality of pixels PX, respectively. Each of the openings 132 may be circular, when viewed in a plan view, but the inventive concepts are not limited thereto. In some embodiments, each of the openings 132 may be tetragonal or rectangular, when viewed in a plan view.

The plurality of openings 132 may respectively overlap the plurality of pixels PX when viewed in a plan view. The light L may be incident into the pixels PX through the openings 132. Each of the openings 132 may have a first width 132W that is smaller than a second width PX_W of each of the pixels PX. The second width PX_W of each of the pixels PX may be a widest width thereof. It will be understood that when each of the plurality of openings 132 is circular, the first width 132W is a diameter thereof, when viewed in a plan view. It will be also understood that when each of the plurality of openings 132 is not circular, the first width 132W is a widest width thereof. The first width 132W and the second width PX_W may be distances measured in a direction parallel to the first surface 100a of the substrate 100 (e.g., in the second direction D2). As shown in FIG. 3, the second width PX_W may be a center-to-center distance between a pair of the device isolation patterns 102 that are located to face each other with each pixel PX interposed therebetween.

As an example, a ratio of the first width 132W to the second width PX_W may be greater than 0 and less than 1 (i.e., 0<132W/PX_W<1). The first width 132W may be selected/adjusted to impede/prevent an oblique light L1, which is incident at an oblique angle relative to the first surface 100a of the substrate 100, from being incident into the pixels PX and be selected/adjusted to allow the oblique light L1 to be reflected by the grid pattern 130. A direct light L2, which is incident at a substantially right angle relative to the first surface 100a of the substrate 100, may be incident onto/into the pixels PX through the openings 132. In other words, the first width 132W may be selected/adjusted to allow each of the pixels PX to selectively collect a portion/fraction (i.e., the direct light L2) of the light L propagating toward the first surface 100a of the substrate 100. Here, the direct light L2 may be defined as a portion/fraction of the light L with an incident angle of about 0° to about 15°. An incident angle of the light L refers to an angle between a direction perpendicular to the first surface 100a of the substrate 100 (e.g., the first direction D1) and the light. If a ratio of the first width 132W to the second width PX_W decreases, a range of the incident angle of the direct light L2 to be collected by each of the pixels PX may be decreased. The first width 132W may be selected/adjusted to allow each of the pixels PX to selectively collect light to be incident at a desired incident angle.

In some embodiments, an opening 132 may be centered with respect to (i.e., aligned with a center of) a lens 140 and/or a photoelectric conversion region PD, as illustrated in FIG. 2. Accordingly, the direct light L2 may be selectively provided from the lens 140 (e.g., from the center thereof) to the photoelectric conversion region PD (e.g., to the center thereof).

The grid pattern 130 may have a third width 130W corresponding to a distance (e.g., shortest distance) between an adjacent pair of the openings 132. Between each adjacent pair of the pixels PX, the device isolation pattern 102 may have a fourth width 102W. The fourth width 102W may be a distance between side surfaces, which are respectively adjacent to each pair of the pixels PX, of the device isolation pattern 102. The third width 130W and the fourth width 102W may be distances that are measured in a direction parallel to the first surface 100a of the substrate 100 (e.g., in the second direction D2). The third width 130W may be larger (i.e., wider) than the fourth width 102W. The grid pattern 130 may be formed of or include a metallic material (e.g., at least one of metals or metal nitrides).

A planarization layer 150 may be provided on the first surface 100a of the substrate 100. The planarization layer 150 may extend on (e.g., cover) the grid pattern 130, and the grid pattern 130 may be provided in the planarization layer 150. The planarization layer 150 may extend on (e.g., cover) the top surface of the grid pattern 130 and may be extended into each of the openings 132 to be in contact with the anti-reflection layer 120. The planarization layer 150 may contain high concentration of impurities. As an example, the planarization layer 150 may contain p-type impurities such as boron (B).

A plurality of micro lenses 140 may be provided on the first surface 100a of the substrate 100. An array/group of the micro lenses 140 may be provided on the planarization layer 150. In some embodiments, the micro lenses 140 may directly contact the planarization layer 150, as illustrated in FIG. 3. The planarization layer 150 may be provided between the substrate 100 and an array of the micro lenses 140, and the grid pattern 130 may be provided between the substrate 100 and the planarization layer 150. When viewed in a plan view, the micro lenses 140 may respectively overlap the pixels PX, and may respectively overlap the openings 132. Accordingly, each of the openings 132 may be overlapped by a corresponding one of the micro lenses 140 and may overlap a corresponding one of the pixels PX, when viewed in a plan view.

Although the term "micro lens" is used herein, it will be understood that the micro lens 140 may be one of various types of lenses for an image sensor. Moreover, it will be understood that the grid pattern 130 may selectively pass or impede light L based on different locations where the grid pattern 130 overlaps a photoelectric conversion region PD (to block/reflect oblique light L1) or has an opening 132 (that passes direct light L2 to the photoelectric conversion region PD). Accordingly, the grid pattern 130 may be referred to herein as "a light-impeding pattern" that is between a first portion of the lens 140 and a first portion of the photoelectric conversion region PD (e.g., a portion that is vertically aligned with the first portion of the lens 140), to block/reflect oblique light L1. Moreover, the light-impeding pattern 130 may include an opening 132 therein between a second portion of the lens 140 and a second portion of the photoelectric conversion region PD (e.g., a portion that is vertically aligned with the second portion of the lens 140), to pass direct light L2.

The first width 132W of each of the openings 132 may be smaller than a diameter 140D of each of the micro lenses 140. As an example, a ratio of the first width 132W to the diameter 140D may be greater than 0 and less than 0.7 (i.e., 0<132W/140D<0.7). For example, the ratio of the first width 132W to the diameter 140D may be about 1:10 (i.e., 132W/140D=0.1). The diameter 140D may be a distance measured in a direction parallel to the first surface 100a of the substrate 100 (e.g., in the second direction D2). The first width 132W of each of the openings 132 may be selected/adjusted to impede/prevent the oblique light L1, which is incident through the micro lenses 140, from being incident onto/into the pixels PX and selected/adjusted to allow the oblique light L1 to be reflected by the grid pattern 130. The direct light L2 to be incident through the micro lenses 140 may be incident onto/into the plurality of pixels PX through the plurality of openings 132. In other words, the first width 132W may be selected/adjusted to allow each of the pixels PX to selectively collect a portion/fraction (i.e., the direct light L2) of the light L propagating toward the first surface 100a of the substrate 100. If a ratio of the first width 132W to the diameter 140D decreases, a range of the incident angle of the direct light L2 to be collected by each of the pixels PX may be decreased.

When viewed in a sectional view, the array of the micro lenses 140 may be spaced apart from the grid pattern 130 by a first distance 150H. In each of the micro lenses 140, the ratio of the first distance 150H to the diameter 140D may range from about 1:1 to about 1:1.5. A curvature radius of each of the micro lenses 140 may range from about 2.8 μm to 3.0 μm. As an example, the curvature radius of each of the micro lenses 140 may be about 2.92 μm.

If a range of an incident angle of light to be collected by each of the pixels PX is relatively large, an image blur phenomenon may occur when a near object is selected as a subject to be imaged. That is, there may be a difficulty in taking an image of a near object.

According to some embodiments of the inventive concepts, each of the openings 132 of the grid pattern 130 may have a width that is smaller than a width of each pixel PX and a diameter of each micro lens 140 (i.e., PX_W and 140D). The width of each of the openings 132 may be selected/adjusted to allow light L, which is collected by each of the pixels PX, to have a relatively small incident angle range. For example, the ratio of the first width 132W to the diameter 140D may be greater than 1:10, greater than 1:9, greater than 1:8, greater than 1:7, greater than 1:6, greater than 1:5, greater than 1:4, greater than 1:3, or greater than 1:2, but less than 0.7 (i.e., first width 132W/diameter 140D<0.7). In some embodiments, the ratio of the first width 132W to the diameter 140D may be at least about 1:2. In some embodiments, the ratio of the first width 132W to the diameter 140D may be about 1:10. This may make it possible to realize an image sensor capable of easily taking an image of a near object. In some embodiments, the image sensor may be used for fingerprint recognition.

Figure 4:
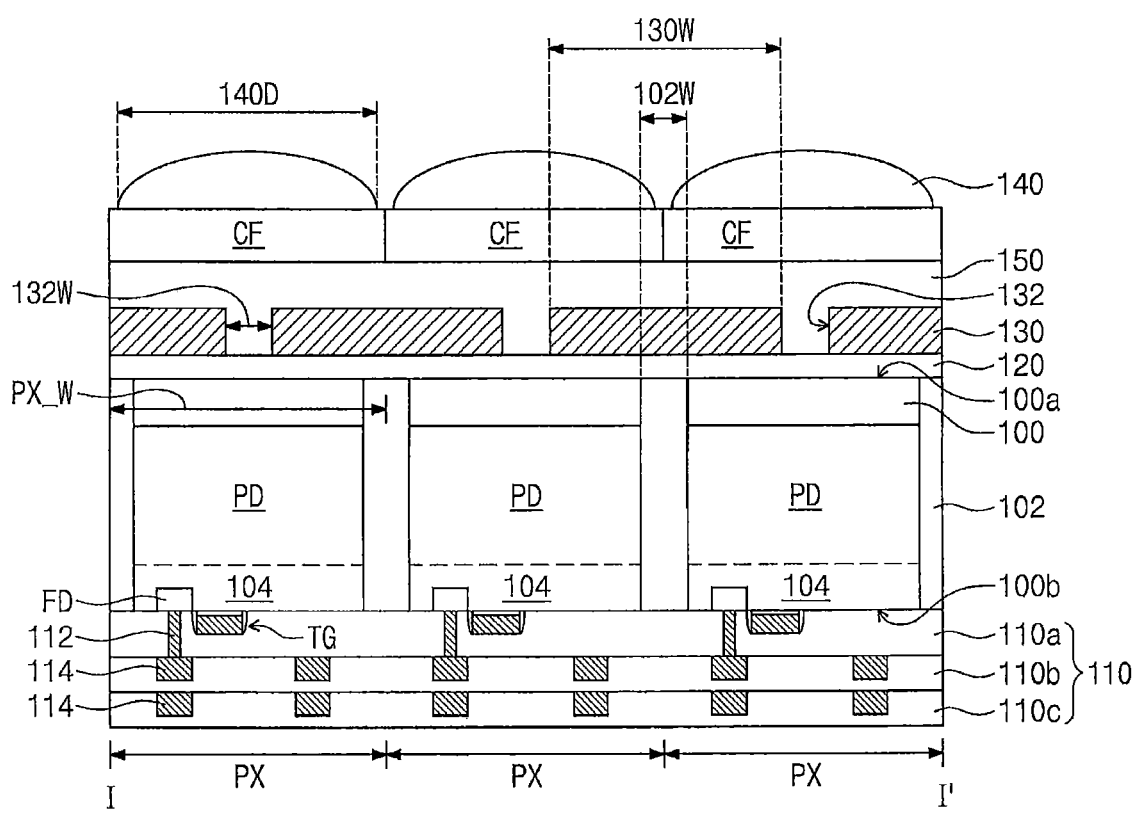
FIG. 4 is a sectional view, which is taken along a line corresponding to the line I-I' of FIG. 2 and illustrates a modified example of an image sensor according to some embodiments of the inventive concepts.
Figure 4:
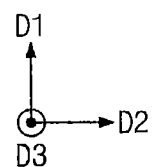

FIG. 4 is a sectional view, which is taken along a line corresponding to the line I-I' of FIG. 2 and illustrates a modified example of an image sensor according to some embodiments of the inventive concepts. In the following description, an element previously described with reference to FIGS. 2 and 3 may be identified by a similar or identical reference number without repeating an overlapping description thereof, for the sake of brevity.

Referring to FIGS. 2 and 4, color filters CF may be provided on the first surface 100a of the substrate 100. An array (e.g., a group) of the color filters CF may be provided between the planarization layer 150 and the array of the micro lenses 140. In some embodiments, the micro lenses 140 may directly contact the color filters CF. When viewed in a plan view normal (e.g., perpendicular) to the first direction D1, the color filters CF may overlap the plurality of pixels PX, respectively, and may overlap the plurality of openings 132, respectively.

Referring to FIGS. 2 and 4, a planarization layer 150 may be provided on the first surface 100a of the substrate 100. The planarization layer 150 may be provided between the anti-reflection layer 120 and the array/group of the color filters CF. The grid pattern 130 may be provided in the planarization layer 150. The planarization layer 150 may extend on (e.g., cover) a top surface of the grid pattern 130 and may extend into each of the openings 132 to be in contact with the anti-reflection layer 120. The planarization layer 150 may contain a high concentration of impurities. As an example, the planarization layer 150 may contain p-type impurities such as boron (B).

Figure 5:
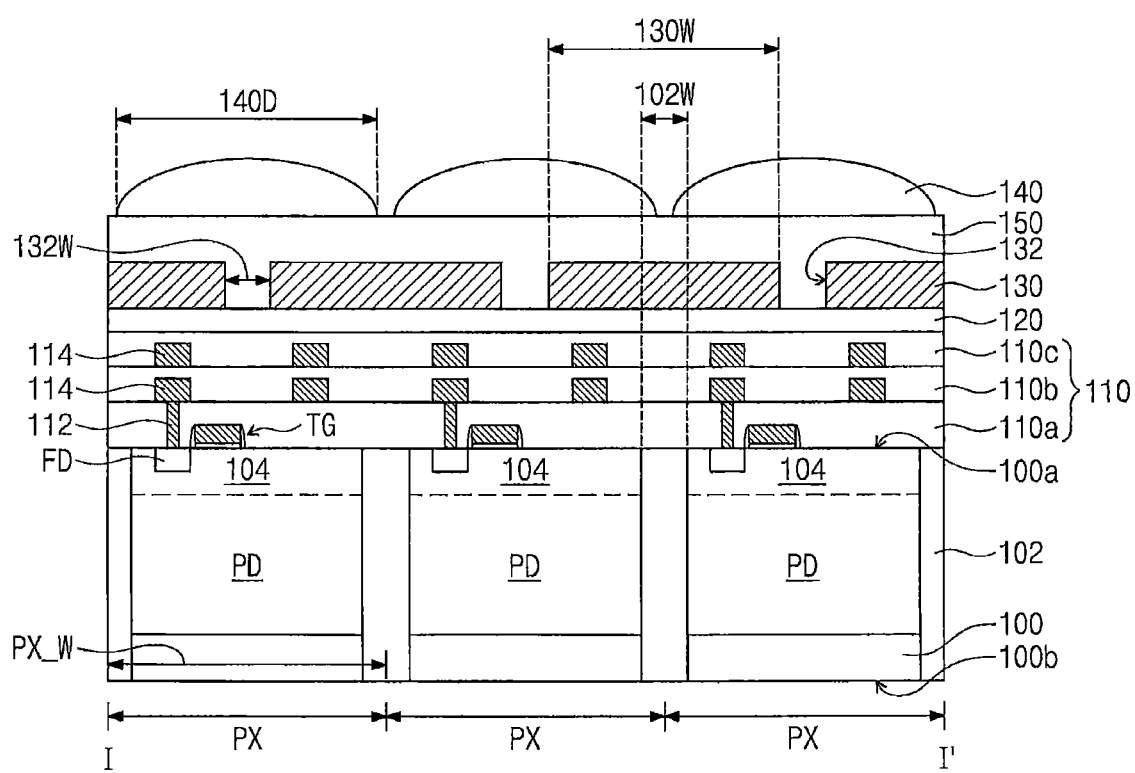
FIG. 5 is a sectional view, which is taken along a line corresponding to the line I-I' of FIG. 2 and illustrates another modified example of an image sensor according to some embodiments of the inventive concepts.
Figure 5:
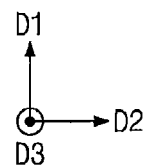

FIG. 5 is a sectional view, which is taken along a line corresponding to the line I-I' of FIG. 2 and illustrates another modified example of an image sensor according to some embodiments of the inventive concepts. In the following description, an element previously described with reference to FIGS. 2 and 3 may be identified by a similar or identical reference number without repeating an overlapping description thereof, for the sake of brevity.

Referring to FIGS. 2 and 5, the photoelectric conversion region PD and the well region 104 may be provided in each of the pixels PX. The well region 104 may be provided adjacent to the first surface 100a of the substrate 100, and the photoelectric conversion region PD may be spaced apart from the first surface 100a of the substrate 100 with the well region 104 interposed therebetween. The floating diffusion region FD may be provided in each of the pixels PX. The floating diffusion region FD may be provided in the well region 104 to be adjacent to the first surface 100a of the substrate 100. The transfer gates TG may be provided on the first surface 100a of the substrate 100.

The interconnection structure 110 may be provided on the first surface 100a of the substrate 100. The interconnection structure 110 may be provided between the substrate 100 and the anti-reflection layer 120. The interconnection structure 110 may include the first interlayer insulating layer 110a, the second interlayer insulating layer 110b, and the third interlayer insulating layer 110c, which are sequentially stacked on the first surface 100a of the substrate 100. The first interlayer insulating layer 110a may be provided to be in contact with the first surface 100a of the substrate 100 and may extend on (e.g., cover) the transfer gates TG. The third interlayer insulating layer 110c may be in contact with the anti-reflection layer 120.

Although FIGS. 3 and 5 do not show color filters CF, it will be understood that color filters CF can be provided between the micro lenses 140 and the planarization layer 150. In some embodiments, the micro lenses 140 of FIGS. 3 and 5 may directly contact underlying the color filters CF.

Figure 6:
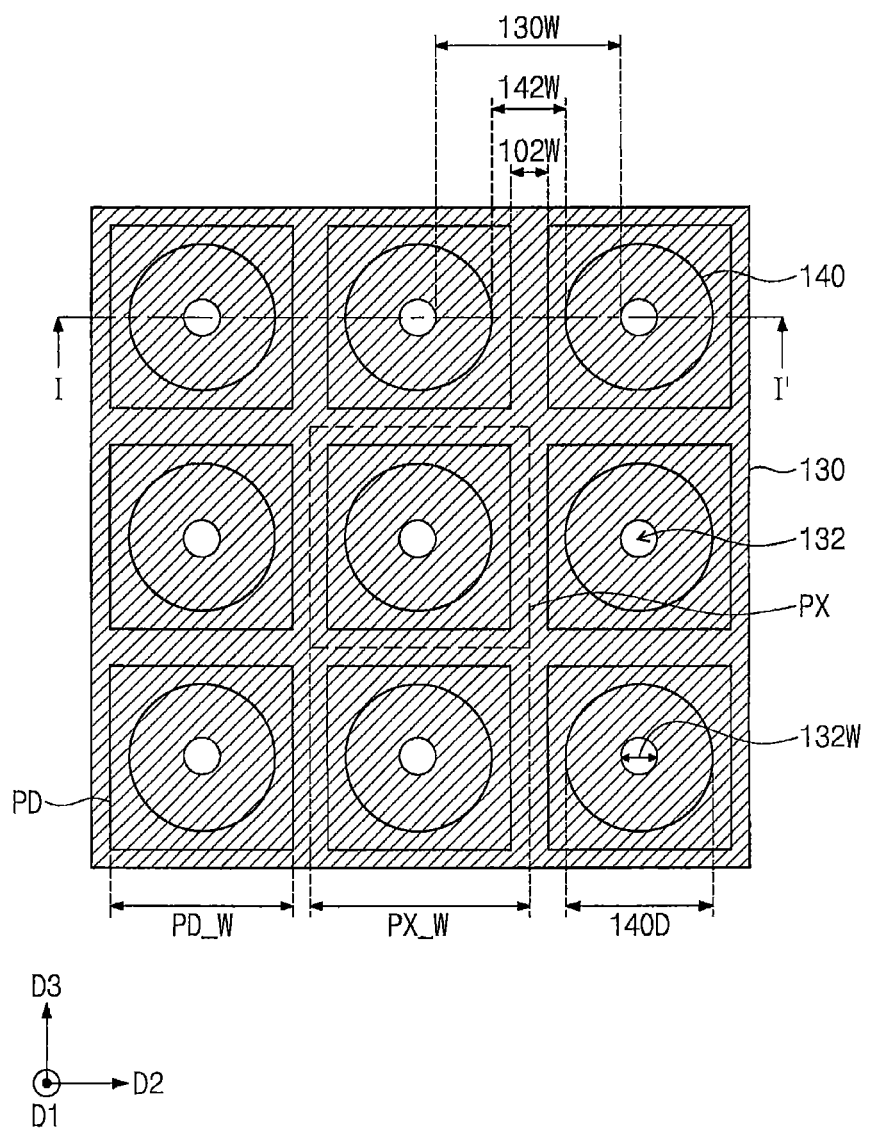
FIG. 6 is a plan view of an image sensor according to some embodiments of the inventive concepts.
Figure 7:
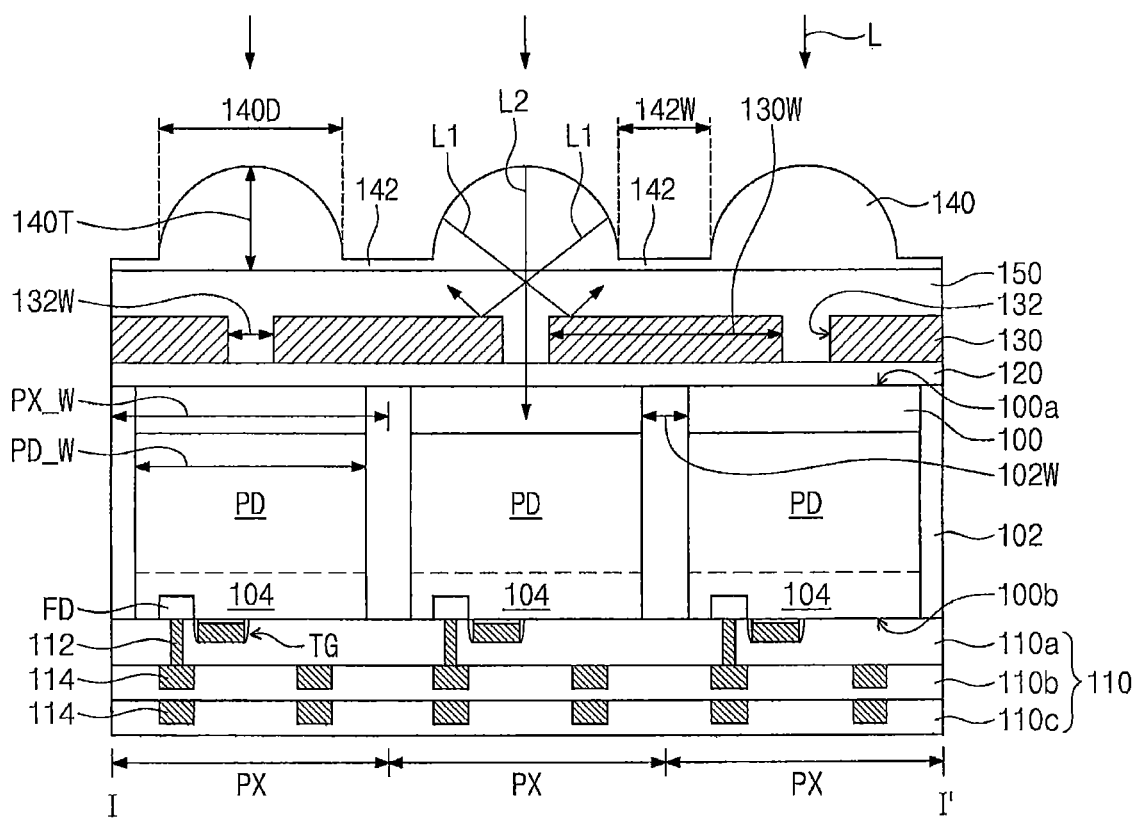
FIG. 7 is a sectional view taken along the line I-I' of FIG. 6.
Figure 7:
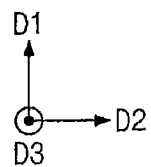

FIG. 6 is a plan view of an image sensor according to some embodiments of the inventive concepts, and FIG. 7 is a sectional view taken along the line I-I' of FIG. 6. In the following description, an element previously described with reference to FIGS. 2 and 3 may be identified by a similar or identical reference number without repeating an overlapping description thereof, for the sake of brevity.

Referring to FIGS. 6 and 7, the micro lenses 140 may be provided on the first surface 100a of the substrate 100. The micro lenses 140 may respectively overlap the pixels PX when viewed in a plan view. The grid pattern 130 may be provided between the substrate 100 and the array/group of the micro lenses 140, and when viewed in a plan view, each of the openings 132 may be overlapped by a corresponding one of the micro lenses 140 and may overlap a corresponding one of the plurality of pixels PX. The first width 132W of each of the openings 132 may be less than the second width PX_W of each of the pixels PX and may be less than the diameter 140D of each of the micro lenses 140.

According to some embodiments, as illustrated in FIG. 7, the diameter 140D of each of the micro lenses 140 may be less (i.e., narrower) than the second width PX_W of each of the pixels PX. If a size of each of the micro lenses 140 is reduced, an amount of light to be collected by each of the micro lenses 140 may be reduced. According to some embodiments, however, as illustrated in FIG. 7, a curvature of each of the micro lenses 140 may increase as the diameter 140D of each of the micro lenses 140 decreases. Accordingly, it may be possible to prevent or suppress an amount of light collected by the micro lenses 140 from being decreased. In other words, the curvature of each of the micro lenses 140 may be selected/adjusted to compensate for the decrease in the amount of light to be collected by each of the micro lenses 140. Furthermore, if the curvature of each of the micro lenses 140 is increased, a ratio of the oblique light L1 to the light L may be increased. In this case, the first width 132W of each of the openings 132 may be more easily selected/adjusted to be within a range in which the oblique light L1 is impeded/prevented from being incident onto/into unintended ones of the pixels PX and is allowed to be reflected by the grid pattern 130. Thus, each of the pixels PX may be used to easily and selectively collect the direct light L2.

The micro lens 140 may have a thickest thickness 140T in the first direction D1, and, in some embodiments, the thickest thickness 140T of the micro lens 140 may be greater than a radius of the micro lens 140 (i.e., half of the diameter 140D).

Each of the micro lenses 140 may be locally provided on the photoelectric conversion region PD of a corresponding one of the pixels PX. The micro lenses 140 may be connected to each other by a flat portion 142 interposed therebetween. The flat portion 142 may overlap the device isolation pattern 102, when viewed in a plan view. The flat portion 142 may have a fifth width 142W corresponding to a distance between curved portions of an adjacent pair of the micro lenses 140. The fifth width 142W may be a distance that is measured in a direction parallel to the first surface 100a of the substrate 100 (e.g., in the second direction D2). The fifth width 142W may be a shortest distance between the curved portions of an adjacent pair of the micro lenses 140, as illustrated in FIG. 6. The fifth width 142W of the flat portion 142 may be smaller (i.e., narrower) than the third width 130W of the grid pattern 130 and may be larger (i.e., wider) than the fourth width 102W of the device isolation pattern 102.

In some embodiments, the diameter 140D of each of the micro lenses 140 may be narrower than a sixth width PD_W of each of the photoelectric conversion regions PD, as illustrated in FIGS. 6 and 7. Accordingly, each of the photoelectric conversion regions PD may include an edge portion that is not overlapped by a corresponding one of the micro lenses 140, when viewed in a plan view. The diameter 140D may be a distance that is measured in a direction parallel to the first surface 100a of the substrate 100 (e.g., in the second direction D2). It will be understood that when each of the micro lenses 140 is not circular, the diameter 140D may be a widest width of each of the micro lenses 140, which is measured in a direction parallel to the first surface 100a of the substrate 100 (e.g., in the second direction D2).

Figure 8:
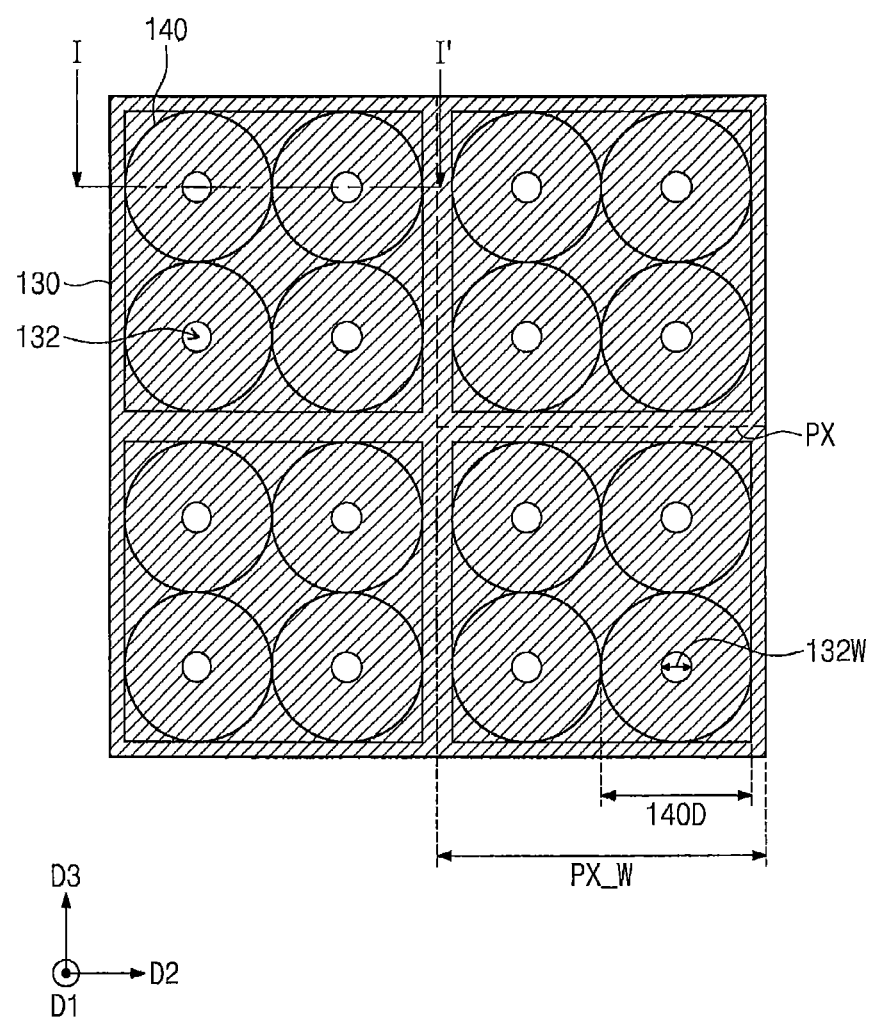
FIG. 8 is a plan view of an image sensor according to some embodiments of the inventive concepts.
Figure 9:
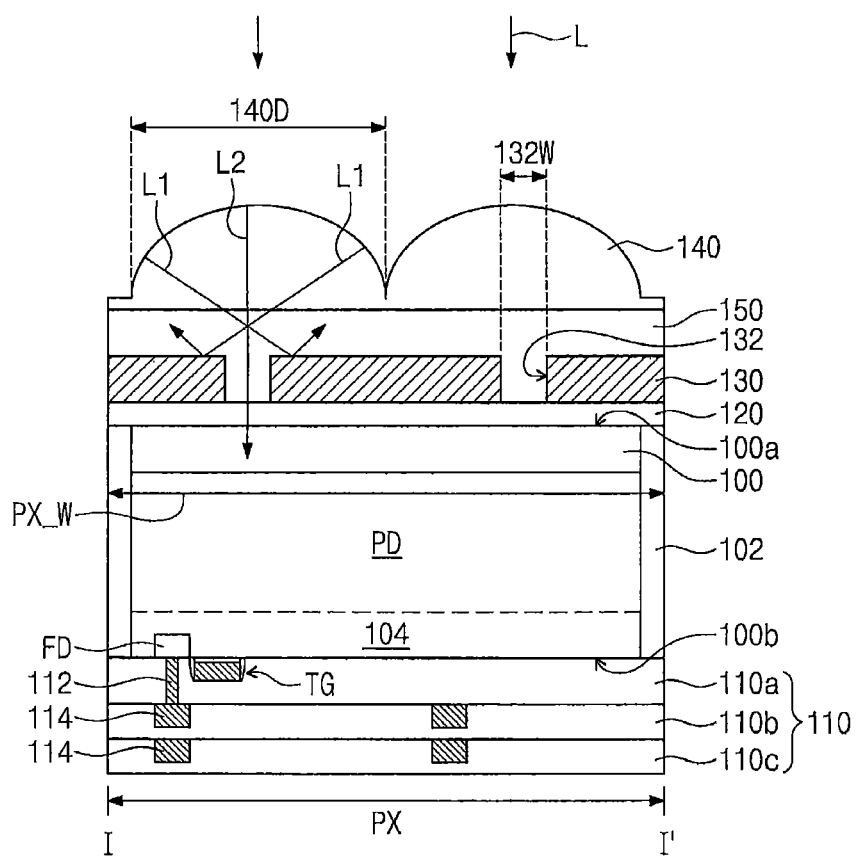
FIG. 9 is a sectional view taken along the line I-I' of FIG. 8.

FIG. 8 is a plan view of an image sensor according to some embodiments of the inventive concepts, and FIG. 9 is a sectional view taken along the line I-I' of FIG. 8. In the following description, an element previously described with reference to FIGS. 2 and 3 may be identified by a similar or identical reference number without repeating an overlapping description thereof, for the sake of brevity.

Referring to FIGS. 8 and 9, the grid pattern 130 may be provided on the first surface 100a of the substrate 100. The anti-reflection layer 120 may be provided between the substrate 100 and the grid pattern 130. The grid pattern 130 may overlap the plurality of pixels PX and the device isolation pattern 102 when viewed in a plan view. The grid pattern 130 may have the plurality of openings 132, which are provided to penetrate (e.g., completely extend through) the grid pattern 130. Each of the openings 132 may be provided to expose a top surface of the anti-reflection layer 120. The plurality of openings 132 may be spaced apart from each other in a direction parallel to the first surface 100a of the substrate 100. According to some embodiments, as illustrated in FIG. 9, more than one of the openings 132 may overlap a common/single/same one of the plurality of pixels PX, when viewed in a plan view. As an example, at least two openings 132 may be provided on each of the pixels PX. Accordingly, at least two openings 132 may overlap a common (i.e., same) one of the pixels PX. Although FIG. 8 illustrates the grid pattern 130 which is formed to have four openings 132 on each of the pixels PX, the inventive concepts are not limited thereto. For example, the number of the openings 132 provided on each of the pixels PX may be variously selected/changed. The first width 132W of each of the openings 132 may be smaller (i.e., narrower) than the second width PX_W of each of the pixels PX.

The micro lenses 140 may be provided on the first surface 100a of the substrate 100. The grid pattern 130 may be provided between the substrate 100 and the array/group of the micro lenses 140, and when viewed in a plan view, the openings 132 may be respectively overlapped by the micro lenses 140. According to some embodiments, as illustrated in FIG. 9, more than one of the micro lenses 140 may respectively overlap a common/single/same one of the pixels PX when viewed in a plan view. As an example, at least two micro lenses 140 may be provided on each of the pixels PX. Although FIG. 8 illustrates a structure including four micro lenses 140 on each of the pixels PX, the inventive concepts are not limited thereto. For example, the number of the micro lenses 140 provided on each of the pixels PX may be variously selected/changed. The first width 132W of each of the openings 132 may be smaller (i.e., narrower) than the diameter 140D of each of the micro lenses 140. The diameter 140D of each of the micro lenses 140 may be smaller (i.e., narrower) than the second width PX_W of each of the pixels PX. As the diameter 140D decreases, the curvature of each of the micro lenses 140 may increase. According to some embodiments, each of the pixels PX may be used to easily and selectively collect the direct light L2.

Figure 10:
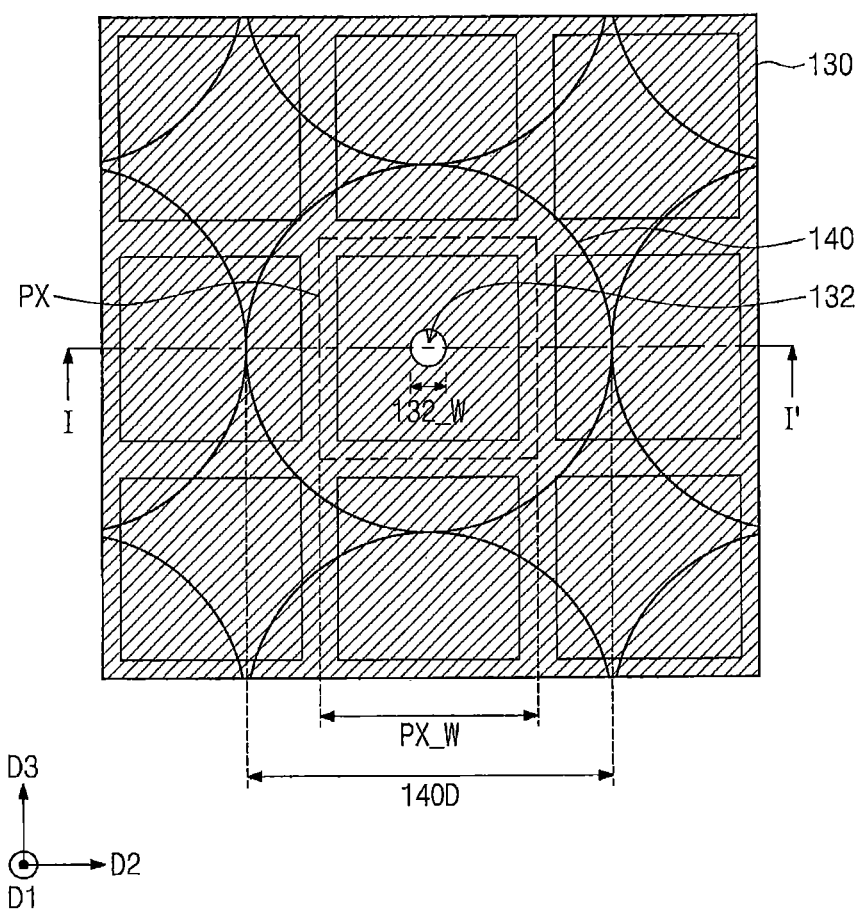
FIG. 10 is a plan view of an image sensor according to some embodiments of the inventive concepts.
Figure 11:
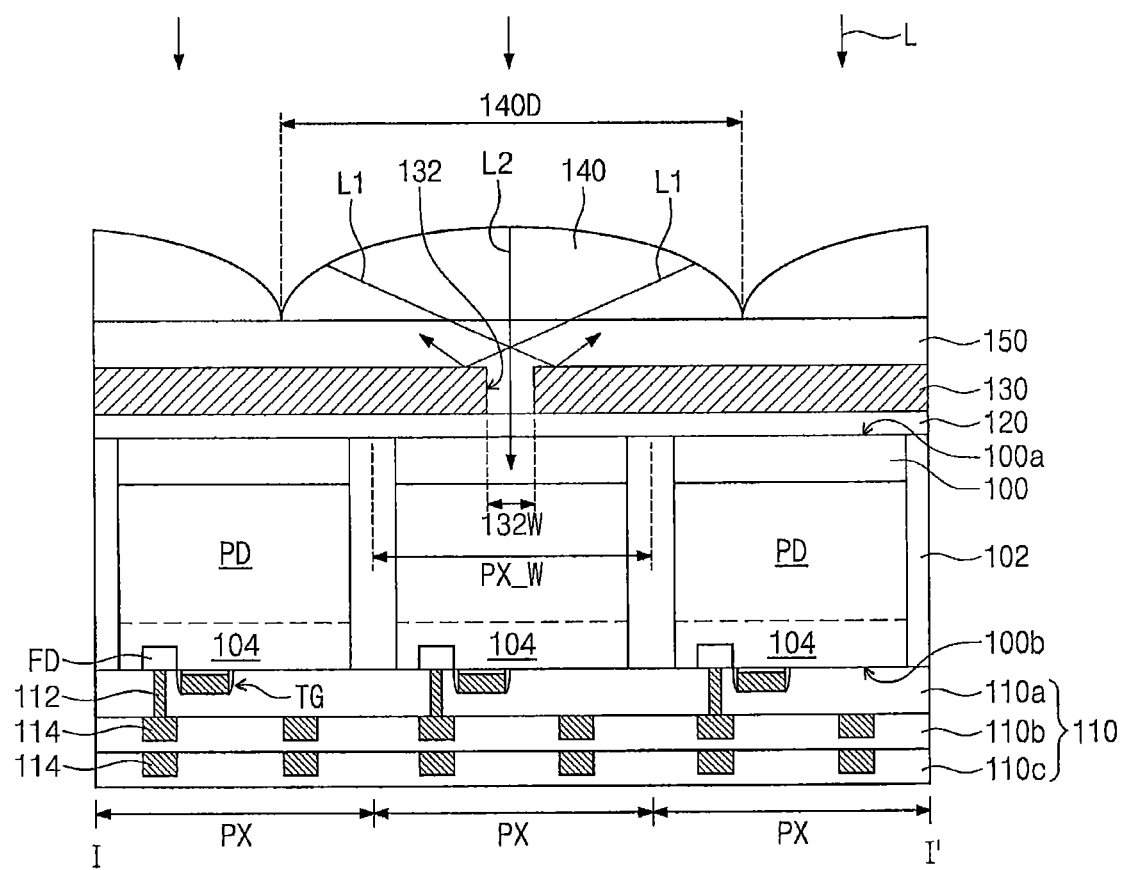
FIG. 11 is a sectional view taken along the line I-I' of FIG. 10.
Figure 11:
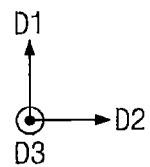

FIG. 10 is a plan view of an image sensor according to some embodiments of the inventive concepts, and FIG. 11 is a sectional view taken along the line I-I' of FIG. 10. In the following description, an element previously described with reference to FIGS. 2 and 3 may be identified by a similar or identical reference number without repeating an overlapping description thereof, for the sake of brevity.

Referring to FIGS. 10 and 11, the grid pattern 130 may be provided on the first surface 100a of the substrate 100. The anti-reflection layer 120 may be provided between the substrate 100 and the grid pattern 130. The grid pattern 130 may overlap the plurality of pixels PX and the device isolation pattern 102, when viewed in a plan view. The grid pattern 130 may have the plurality of openings 132, which are provided to penetrate the grid pattern 130. Each of the openings 132 may be provided to expose a top surface of the anti-reflection layer 120. According to some embodiments, each of the openings 132 may overlap a corresponding one of the plurality of pixels PX, when viewed in a plan view. The grid pattern 130 may extend onto neighboring pixels PX, which are located directly adjacent to the corresponding one of the pixels PX that is overlapped by an opening 132, and the grid pattern 130 may cover respective portions of the neighboring pixels PX. That is, the opening 132 of the grid pattern 130 may be formed to impede/prevent the light L from being incident into the neighboring pixels PX that are located directly adjacent thereto. The first width 132W of each of the openings 132 may be smaller (i.e., narrower) than the second width PX_W of each of the pixels PX. In some embodiments, the grid pattern 130 may entirely covers upper surfaces of photoelectric conversion regions PD of the neighboring pixels PX, as illustrated in FIG. 10. Referring to FIG. 10, in some embodiments, no openings 132 of the grid pattern 130 may overlap the photoelectric conversion regions PD of the neighboring pixels PX.

The micro lenses 140 may be provided on the first surface 100a of the substrate 100. The grid pattern 130 may be provided between the substrate 100 and the array/group of the micro lenses 140. The openings 132 may be respectively overlapped by the micro lenses 140 when viewed in a plan view. According to some embodiments, each of the micro lenses 140 may respectively overlap a corresponding one of the pixels PX, when viewed in a plan view. Each of the micro lenses 140 may extend onto neighboring pixels PX, which are located directly adjacent to the corresponding one of the pixels PX that is overlapped by an opening 132. The first width 132W of each of the openings 132 may be smaller (i.e., narrower) than the diameter 140D of each of the micro lenses 140. The diameter 140D of each of the micro lenses 140 may be larger (i.e., wider) than the second width PX_W of each of the pixels PX. In this case, as the size of the micro lenses 140 increases, an amount of light to be collected by the micro lenses 140 may be increased.

Figure 12A:
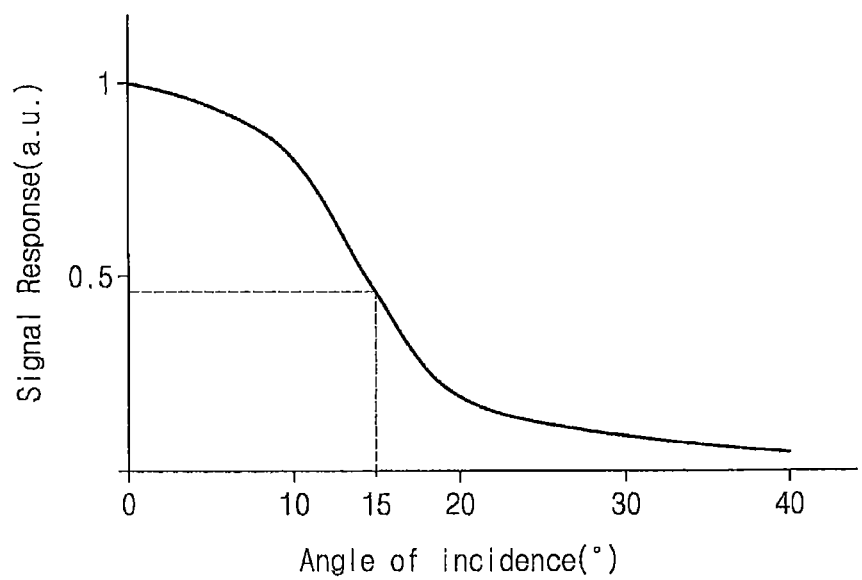
FIG. 12A is a graph showing an angular response of an image sensor according to some embodiments of the inventive concepts.
Figure 12B:
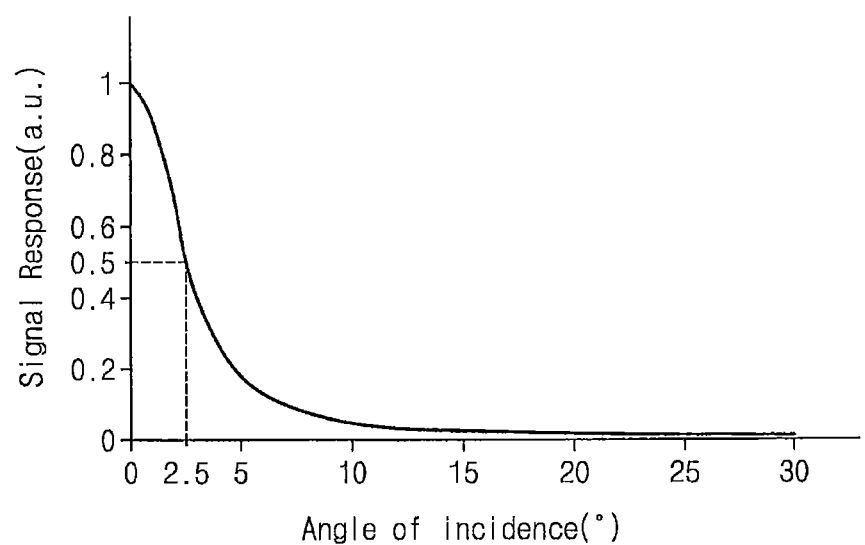
FIG. 12B is a graph showing an angular response of an image sensor according to some embodiments of the inventive concepts.

FIGS. 12A and 12B are graphs, each of which shows an angular response of an image sensor according to some embodiments of the inventive concepts.

Referring to FIG. 12A, an image sensor according to some embodiments of the inventive concepts may generate signal in response to an oblique light to be incident at an incident angle of about 15° or greater, which has magnitude (i.e. a ratio of output signal to input signal) that is less than 50% of magnitude of signal generated in response to a direct light (e.g., light having an incident angle of 0°) to be incident in a direction normal (e.g., perpendicular) to the first surface 100a. It will be understood that a grid pattern 130 of the image sensor may impede/prevent more than 50% of an oblique light with an incident angle of about 15° or greater from being incident into pixels PX of the image sensor. This may be achieved when each of the openings 132 of the grid pattern 130 have a desired (e.g., predetermined) width that is smaller than a width of each of the pixels PX and a diameter of each of the micro lenses 140. It will be also understood that magnitude of signal generated by a pixel of an image sensor may be proportional to the number electrical charges (e.g., electrons) generated by the pixel of the image sensor.

Referring to FIG. 12B, an image sensor according to some embodiments of the inventive concepts may generate signal in response to an oblique light to be incident at an incident angle of about 2.5° or greater, which has magnitude that is less than 50% of magnitude of signal generated in response to a direct light (e.g., light having an incident angle of 0°) to be incident in a direction normal to the first surface 100a. It will be understood that a grid pattern 130 of the image sensor may impede/prevent more than 50% of an oblique light with an incident angle of about 2.5° or greater from being incident into pixels PX of the image sensor. This may be achieved when a ratio of the first width 132W of the opening 132 of the grid pattern 130 to the diameter 140D of the micro lens 140 is about 1:10, a ratio of the first distance 150H to the diameter 140D of the micro lens 140 ranges from about 1:1 to about 1:1.5, and a curvature radius of the micro lens 140 is about 2.92 μm.

Figure 13A:
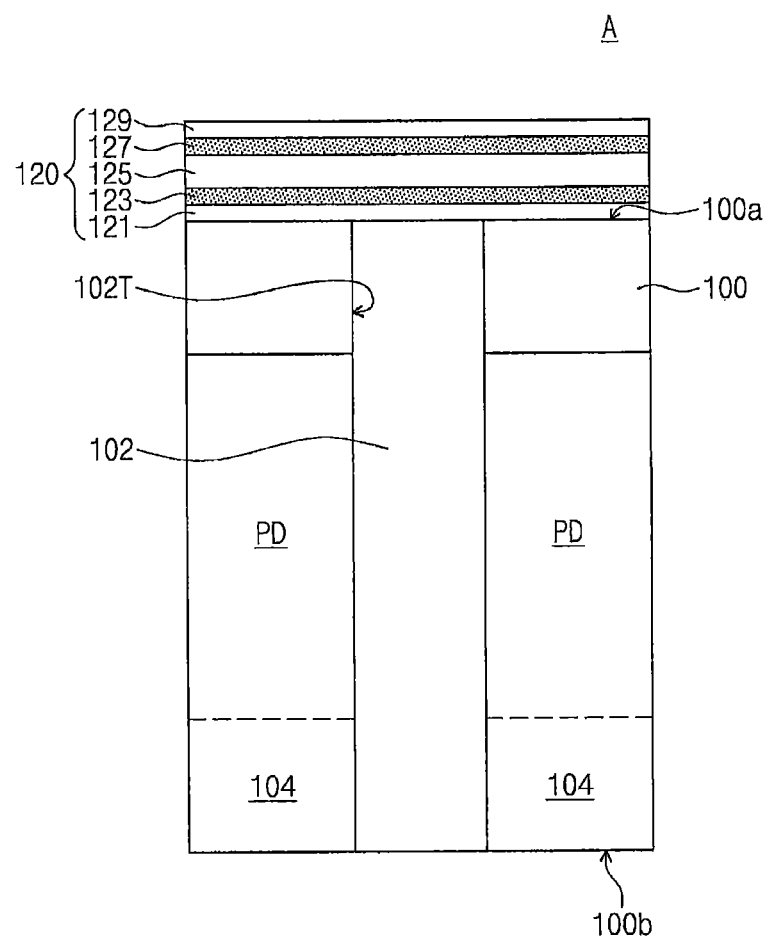
FIGS. 13A and 13B are sectional views of the portion A of FIG. 3 according to some embodiments of the inventive concepts.
Figure 13B:
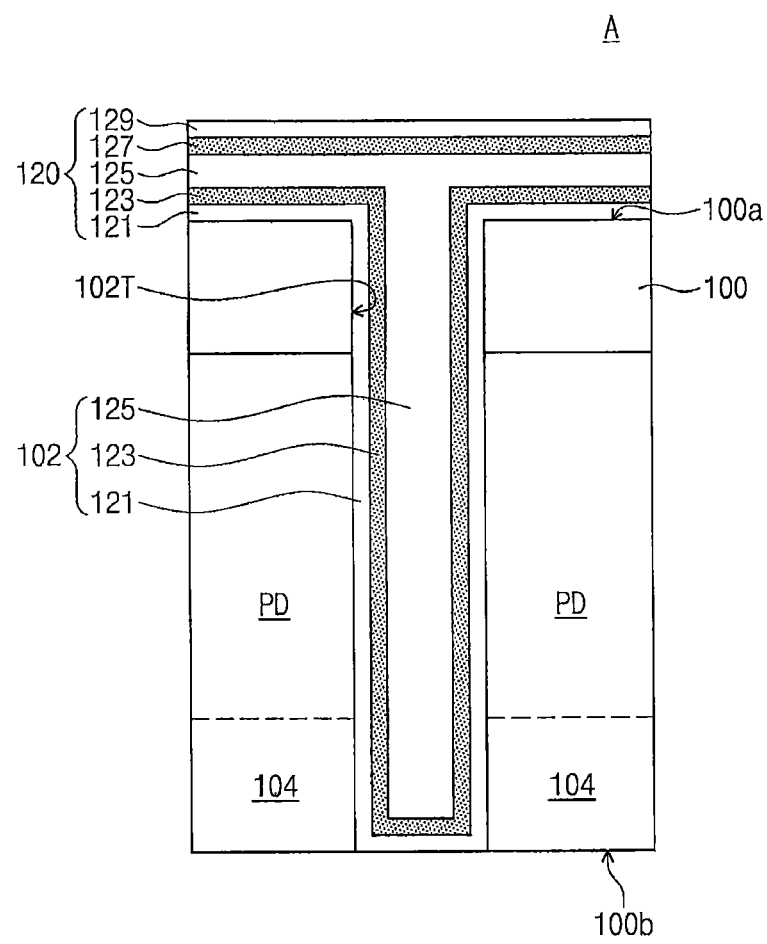

FIGS. 13A and 13B are sectional views, each of which illustrates the portion A of FIG. 3. Hereinafter, the anti-reflection layer 120 of an image sensor according to some embodiments of the inventive concepts will be described in more detail.

Referring to FIG. 13A, the anti-reflection layer 120 according to some embodiments of the inventive concepts may be provided to extend on (e.g., cover) the top surface of the device isolation pattern 102, and the device isolation pattern 102 may be formed of or include at least one of oxide, nitride, and oxynitride. The device isolation pattern 102 may include oxide, nitride, and/or oxynitride. The anti-reflection layer 120 may be a multi-layered structure including a plurality of layers sequentially stacked on the first surface 100a of the substrate 100. For example, the anti-reflection layer 120 may include a first oxide 121, a second oxide 123, a third oxide 125, a fourth oxide 127, and a fifth oxide 129, which are sequentially stacked on the first surface 100a of the substrate 100. In some embodiments, the first oxide 121 and the fifth oxide 129 may be formed of or include the same material. As an example, the first oxide 121 and the fifth oxide 129 may be formed of or include aluminum oxide. In some embodiments, the second oxide 123 and the fourth oxide 127 may be formed of or include the same material. As an example, the second oxide 123 and the fourth oxide 127 may be formed of or include hafnium oxide. The third oxide 125 may be formed of or include, for example, silicon oxide. The third oxide 125 may be thicker than other oxides 121, 123, 127, and 129.

Referring to FIG. 13B, the anti-reflection layer 120 according to some embodiments of the inventive concepts may be a multi-layered structure including a plurality of layers, which are sequentially stacked on the first surface 100a of the substrate 100. For example, the anti-reflection layer 120 may include the first oxide 121, the second oxide 123, the third oxide 125, the fourth oxide 127, and the fifth oxide 129, which are sequentially stacked on the first surface 100a of the substrate 100. In some embodiments, at least a portion of the anti-reflection layer 120 (e.g., at least a portion of the first to fifth oxides 121, 123, 125, 127, and 129) may be extended into a trench 102T that penetrates the substrate 100. The at least portion of the anti-reflection layer 120 may be the device isolation pattern 102.

Figure 14A:
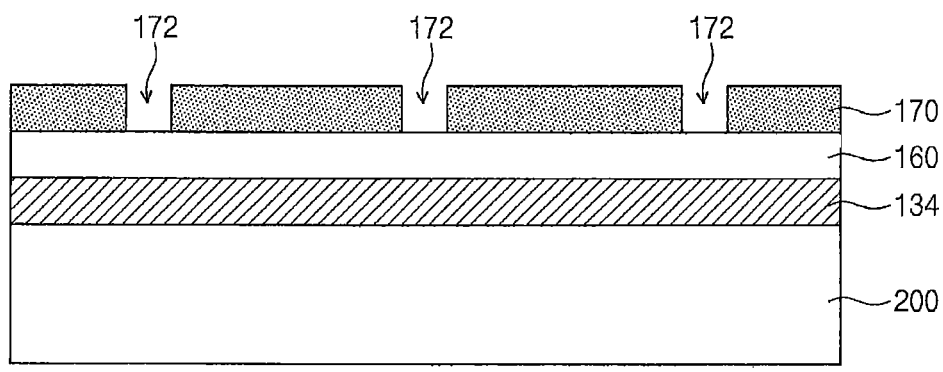
FIGS. 14A to 14C are sectional views, which are taken along a line corresponding to the line I-I' of FIG. 2 to illustrate a method of forming a grid pattern of an image sensor according to some embodiments of the inventive concepts.
Figure 14B:
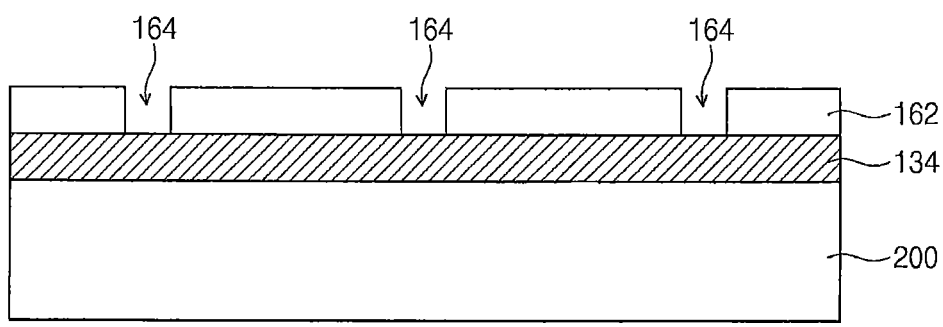
Figure 14C:
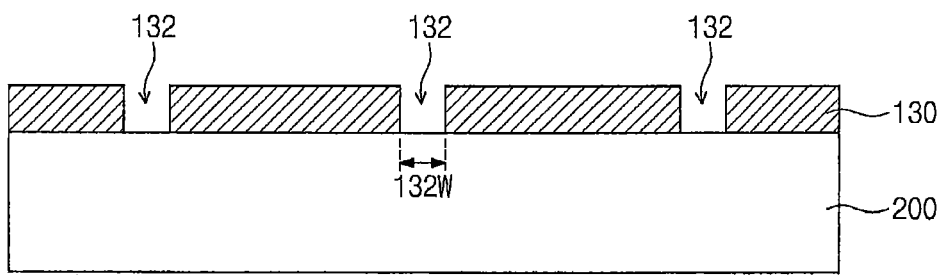

FIGS. 14A to 14C are sectional views, which are taken along a line corresponding to the line I-I' of FIG. 2 to illustrate a method of forming a grid pattern of an image sensor according to some embodiments of the inventive concepts. In order to reduce complexity in the drawings, detailed illustrations of the substrate 100, the interconnection structure 110, and the anti-reflection layer 120 are omitted from FIGS. 14A to 14C.

Referring to FIG. 14A, a metal layer 134 and a mask layer 160 may be sequentially formed on a lower structure 200. The lower structure 200 may be a structure, in which the substrate 100, the interconnection structure 110, and the anti-reflection layer 120 described with reference to FIGS. 3 to 5 are provided. The lower structure 200 may include elements (e.g., the photoelectric conversion region PD, the interconnection lines 114, and so forth), which are provided in the substrate 100 and the interconnection structure 110. The metal layer 134 may be formed of or include at least one of metals and metal nitrides. The metal layer 134 may include metal and/or metal nitride. The mask layer 160 may be a hard mask layer which is formed of or includes at least one of oxide, nitride, and oxynitride. The mask layer 160 may include oxide, nitride, and/or oxynitride.

A photoresist pattern 170 may be formed on the mask layer 160. The photoresist pattern 170 may be used to form the grid pattern 130 described with reference to FIGS. 3 to 5. The photoresist pattern 170 may include a plurality of first holes 172, which are formed to penetrate the photoresist pattern 170 and to expose a top surface of the mask layer 160. Each of the first holes 172 may define a shape and a position of a corresponding one of the openings 132 which will be formed in the grid pattern 130.

Referring to FIG. 14B, the mask layer 160 may be etched using the photoresist pattern 170 as an etch mask to form a mask pattern 162. As an example, the etching of the mask layer 160 may be performed using a dry etching process. The photoresist pattern 170 may be removed using an ashing and/or strip process. The mask pattern 162 may include a plurality of second holes 164, which are formed to penetrate the mask pattern 162 and to expose a top surface of the metal layer 134. Each of the second holes 164 may be used to define a position and a shape of a corresponding one of the openings 132, which will be formed in the metal layer 134.

Referring to FIG. 14C, the metal layer 134 may be etched using the mask pattern 162 as an etch mask to form the grid pattern 130. As an example, the etching of the metal layer 134 may be performed using a dry etching process. The mask pattern 162 may be removed using, for example, a strip process. The grid pattern 130 may include the plurality of openings 132, which are formed to penetrate the grid pattern 130 and to expose a top surface of the lower structure 200. As described with reference to FIGS. 3 to 5, each of the openings 132 may be formed to have a desired (e.g., predetermined) width 132W.

The grid pattern 130 described with reference to FIGS. 6 to 11 may be formed by substantially the same or similar method.

Figure 15A:
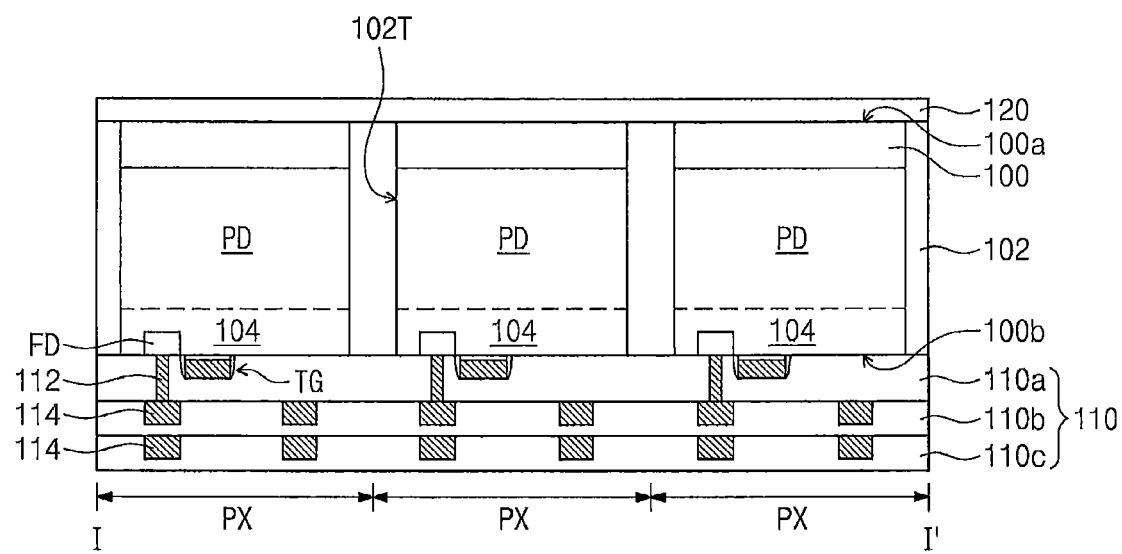
FIGS. 15A and 15B are sectional views, which are taken along a line corresponding to the line I-I' of FIG. 2 to illustrate a method of fabricating an image sensor according to some embodiments of the inventive concepts.
Figure 15A:
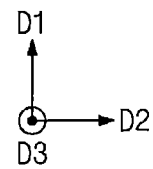
Figure 15B:
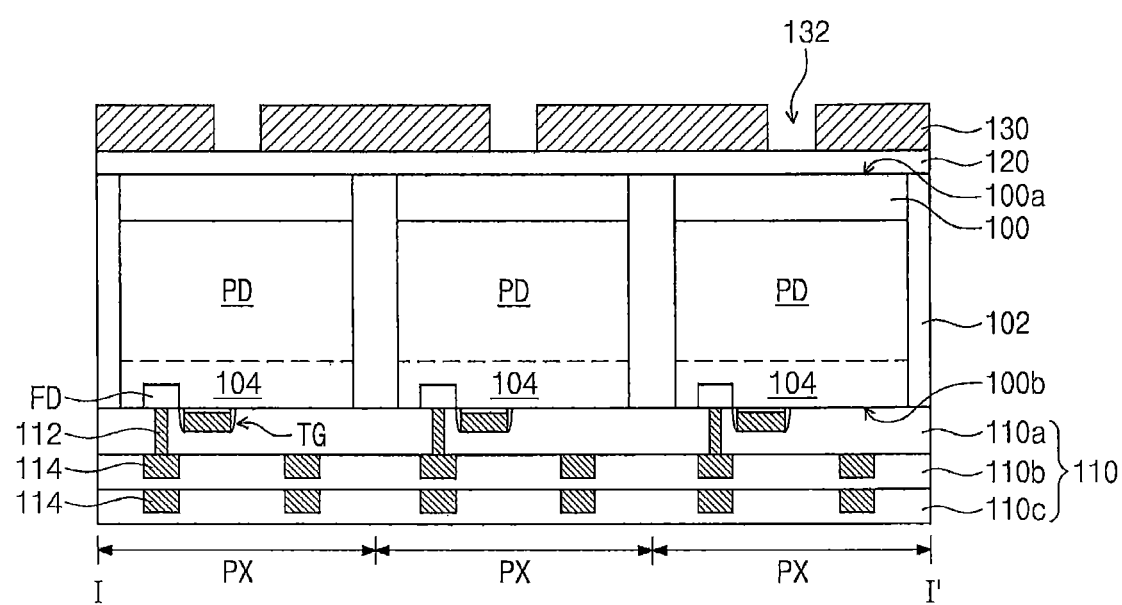
Figure 15B:
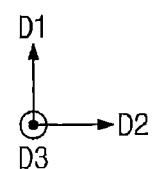

FIGS. 15A and 15B are sectional views, which are taken along a line corresponding to the line I-I' of FIG. 2 to illustrate a method of fabricating an image sensor according to some embodiments of the inventive concepts.

Referring to FIG. 15A, the device isolation pattern 102 may be formed in the substrate 100. The formation of the device isolation pattern 102 may include forming the trench 102T to penetrate at least a portion of the substrate 100 and forming an insulating layer to fill the trench 102T. The photoelectric conversion region PD and the well region 104 may be formed in the substrate 100. The photoelectric conversion region PD may be formed by doping a portion of the substrate 100 with the first conductivity type impurities, and the well region 104 may be formed by doping another portion of the substrate 100 with the second conductivity type impurities. In addition, the floating diffusion region FD and the transfer gates TG adjacent thereto may be formed in the substrate 100. The floating diffusion region FD may be formed by doping other region of the substrate 100 with the first conductivity type impurities.

The interconnection structure 110 may be formed on the second surface 100b of the substrate 100. The formation of the interconnection structure 110 may include forming the first interlayered insulating layer 110a on the second surface 100b of the substrate 100 to extend on (e.g., cover) the transfer gates TG, forming the vias 112 to penetrate the first interlayered insulating layer 110a, forming the interconnection lines 114 on the first interlayered insulating layer 110a to connect the vias 112 to each other, and forming the second and third interlayered insulating layers 110b and 110c to extend on (e.g., cover) the interconnection lines 114. In some embodiments, after the formation of the interconnection structure 110, a back-grinding process may be performed on the first surface 100a of the substrate 100. The back-grinding process may be performed to expose the device isolation pattern 102 through the first surface 100a of the substrate 100. Thereafter, the anti-reflection layer 120 may be formed on the first surface 100a of the substrate 100.

As an example, as shown in FIG. 13A, the anti-reflection layer 120 may be a multi-layered structure including a plurality of layers sequentially stacked on the first surface 100a of the substrate 100. As an example, as shown in FIG. 13B, at least a portion of the anti-reflection layer 120 (i.e., at least a portion of the first to fifth oxides 121, 123, 125, 127, and 129) may be formed to extend on (e.g., cover) an inner surface of the trench 102T, and in this case, the at least portion of the anti-reflection layer 120 may be at least a portion of the device isolation pattern 102.

Referring to FIG. 15B, the grid pattern 130 may be formed on the anti-reflection layer 120. The grid pattern 130 may be formed by the method described with reference to FIGS. 14A to 14B.

Referring back to FIG. 3, the planarization layer 150 and the array/group of the micro lenses 140 may be sequentially formed on the grid pattern 130.

Figure 16:
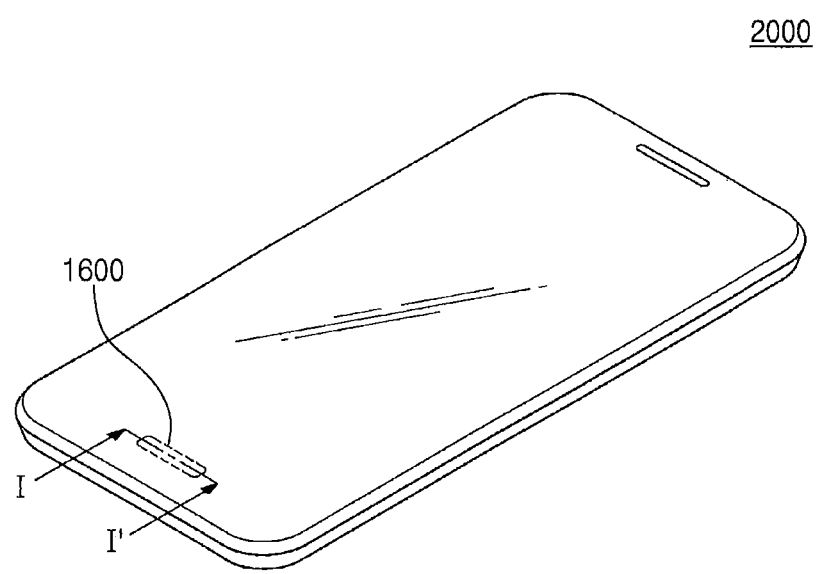
FIG. 16 is a schematic diagram of an electronic device including an image sensor according to some embodiments of the inventive concepts.
Figure 17:
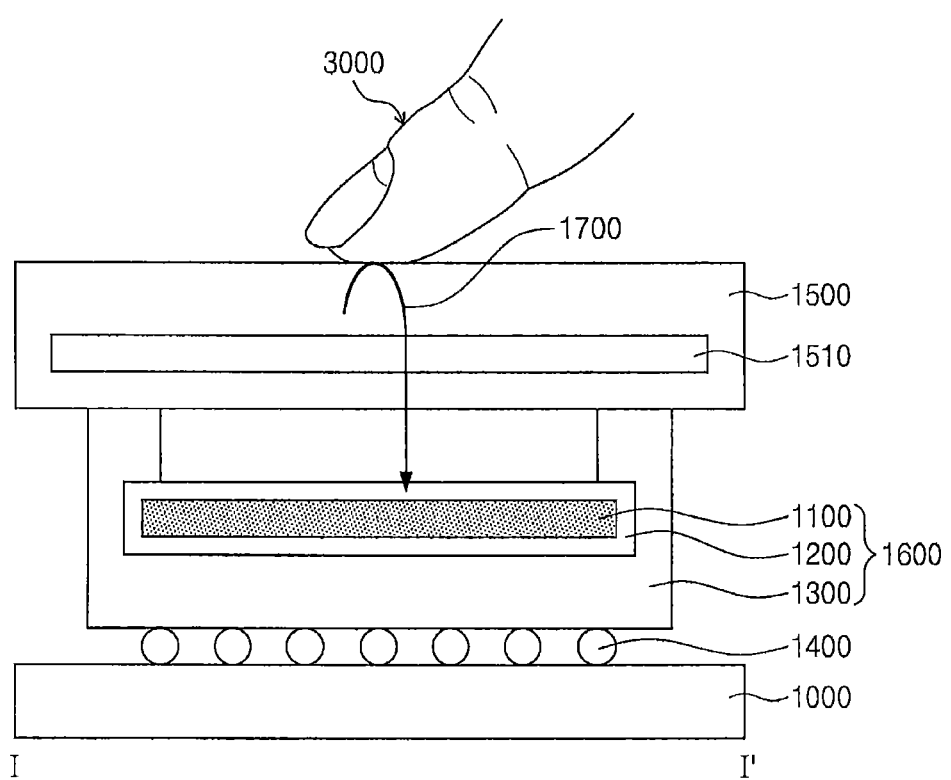
FIG. 17 is a sectional view taken along the line I-I' of FIG. 16.

FIG. 16 is a schematic diagram of an electronic device including an image sensor according to some embodiments of the inventive concepts. FIG. 17 is a sectional view taken along the line I-I' of FIG. 16 illustrating structure and operation of the image sensor.

Referring to FIGS. 16 and 17, an image sensor according to some embodiments of the inventive concepts may be used as a part of an electronic device 2000 (e.g., a mobile phone or a smart phone) with an imaging function. The electronic device 2000 may include a printed circuit board 1000, a display panel 1500 provided on the printed circuit board 1000, and a sensing unit 1600 between the printed circuit board 1000 and the display panel 1500. The display panel 1500 may include a light source 1510 (e.g., OLED) provided therein. The sensing unit 1600 may be electrically connected to the printed circuit board 1000 through conductive elements 1400. The sensing unit 1600 may include a fingerprint sensor 1100, which is provided on a package substrate 1300, and a protection layer 1200, which is provided on the package substrate 1300 to extend on (e.g., cover) the fingerprint sensor 1100. The sensing unit 1600 may be referred to as an optical scanner, and the fingerprint sensor 1100 may be referred to as an optical sensor.

Referring to FIG. 17, when a finger 3000 touches a surface of a portion of the display panel 1500, light may be emitted from the light source 1510 of the display panel 1500 and may be reflected off the finger 3000, and the fingerprint sensor 1100 may sense the reflected light 1700. In some embodiments, the reflected light 1700 may travel through the display panel 1500 (e.g., the light source 1510 of the display panel 1500) as illustrated in FIG. 17. The image sensors according to some embodiments of the inventive concepts may be used as the fingerprint sensor 1100. In this case, the image sensors may be configured to selectively collect a direct light to be incident into the sensor 1100 in a substantially perpendicular direction. This may make it possible to easy recognize the fingerprint. In some embodiments, no additional lens (e.g., module lens) may be provided between the light source 1510 of the display panel 1500 and the fingerprint sensor 1100 that includes micro lenses therein. In some embodiments, no additional lens (e.g., module lens) may be provided between a surface of a portion of the display panel 1500, which a finger contacts, and the fingerprint sensor 1100 that includes micro lenses therein.

It will be understood that when the fingerprint sensor 1100 is assembled with the display panel 1500, the first surface 100a of the substrate 100 of FIGS. 3, 4, 5, 7, 9, and 11 faces the display panel 1500, and thus the micro lenses 140 are provided between the display panel 1500 and the grid pattern 130.

It will be understood that the portion of the display panel 1500 overlapping the fingerprint sensor 1100 and a remaining portion of the display panel 1500 may include the same elements, and thus the portion of the display panel 1500 may be also used to display images when this portion is not used as a scanner. Accordingly, the display panel 1500 may not include a portion that is dedicated only for scanning.

According to some embodiments of the inventive concepts, a grid pattern may have a plurality of openings, each of which penetrates (e.g., completely extend through) the grid pattern, vertically overlaps a corresponding one of pixels, and is vertically overlapped by a corresponding one of micro lenses. Each of the openings may have a width that is smaller (i.e., narrower) than a width of the corresponding pixel and a diameter of the corresponding micro lens, and thus, the corresponding pixel may be used to selectively collect light to be incident at a desired (e.g., predetermined) incident angle. This may make it possible to realize an image sensor capable of easily reducing image blur when taking an image of a near object (e.g., finger), as reducing the range of incident angles of light collected by the pixels may reduce image blur.

According to some embodiments of the inventive concepts, the width of each of the openings in the grid pattern may be selected/adjusted to allow the corresponding pixel to selectively collect light to be incident at a desired incident angle. Thus, in an image sensor according to some embodiments of the inventive concepts, it may be possible to selectively collect light to be incident at the desired incident angle and to easily reduce image blur when taking an image of a near object.

The above-disclosed subject matter is to be considered illustrative, and not restrictive, and the appended claims are intended to cover all such modifications, enhancements, and other embodiments, which fall within the true spirit and scope of the inventive concepts. Thus, to the maximum extent allowed by law, the scope is to be determined by the broadest permissible interpretation of the following claims and their equivalents, and shall not be restricted or limited by the foregoing detailed description.

What is claimed is:

1. An optical sensor of an optical scanner, the optical sensor comprising:
    a plurality of photoelectric conversion regions;
    a plurality of lenses on the plurality of photoelectric conversion regions;
    a light-impeding layer extending between the plurality of photoelectric conversion regions and the plurality of lenses, the light-impeding layer comprising:
        a first opening between a first one of the plurality of photoelectric conversion regions and the plurality of lenses; and
        a second opening between a second one of the plurality of photoelectric conversion regions and the plurality of lenses; and
    a planarization layer on the light-impeding layer,
    wherein the first opening overlaps the first one of the plurality of photoelectric conversion regions, and the first one of the plurality of photoelectric conversion regions is configured to generate charges in response to light that is incident on the first one of the plurality of photoelectric conversion regions,
    wherein the plurality of lenses are arranged along a first direction,
    wherein a first one of the plurality of lenses is spaced apart from the light-impeding layer in a second direction that is perpendicular to the first direction,
    wherein a shortest distance between the first one of the plurality of lenses and the light-impeding layer in the second direction is equal to or less than a width of the first one of the plurality of lenses in the first direction,
    wherein a width of the first opening in the first direction is smaller than a distance between the first opening and the second opening in the first direction, and
    wherein the optical sensor is configured to be assembled with an organic light emitting diode such that the first one of the plurality of lenses is disposed between the first opening and the organic light emitting diode.

2. The optical sensor of claim 1,
    wherein a ratio of the width of the first opening in the first direction to the width of the first one of the plurality of lenses in the first direction is greater than 0 and less than 0.7.

3. The optical sensor of claim 2,
    wherein the ratio of the width of the first opening in the first direction to the width of the first one of the plurality of lenses in the first direction is greater than 1:3.

4. The optical sensor of claim 3,
    wherein the ratio of the width of the first opening in the first direction to the width of the first one of the plurality of lenses in the first direction is greater than 1:2.

5. The optical sensor of claim 4,
    wherein a ratio of the shortest distance between the first one of the plurality of lenses and the light-impeding layer in the second direction to the width of the first one of the plurality of lenses in the first direction is from 1:1 to 1:1.5.

6. The optical sensor of claim 5, wherein the first opening and the second opening are circular in a plan view.

7. The optical sensor of claim 6,
    wherein the plurality of lenses directly contact the planarization layer.

8. The optical sensor of claim 7,
    wherein a center of the first one of the plurality of lenses in the first direction is vertically aligned with a center of the first opening in the first direction.

9. An optical sensor of an optical scanner, the optical sensor comprising:
    a plurality of photoelectric conversion regions;
    a plurality of lenses on the plurality of photoelectric conversion regions;
    a light-impeding layer extending between the plurality of photoelectric conversion regions and the plurality of lenses, the light-impeding layer comprising:
        a first opening between a first one of the plurality of photoelectric conversion regions and the plurality of lenses; and
        a second opening between a second one of the plurality of photoelectric conversion regions and the plurality of lenses; and
    a planarization layer on the light-impeding layer,
    wherein the first opening overlaps the first one of the plurality of photoelectric conversion regions, and the first one of the plurality of photoelectric conversion regions is configured to generate charges in response to a direct light that is a portion of light incident on the plurality of lenses,
    wherein the plurality of lenses are arranged along a first direction, wherein a first one of the plurality of lenses is spaced apart from the light-impeding layer in a second direction that is perpendicular to the first direction, wherein a shortest distance between the first one of the plurality of lenses and the light-impeding layer in the second direction is equal to or less than a width of the first one of the plurality of lenses in the first direction, wherein a ratio of a width of the first opening in the first direction to the width of the first one of the plurality of lenses in the first direction is greater than 0 and less than 0.7, wherein the direct light passes through the first opening with an incident angle of about 0° to about 15°, wherein the width of the first opening in the first direction is smaller than a distance between the first opening and the second opening in the first direction, and wherein the optical sensor is configured to be assembled with an organic light emitting diode such that the first one the plurality of lenses is disposed between the first opening and the organic light emitting diode.

10. An optical sensor of an optical scanner, the optical sensor comprising:
   a plurality of photoelectric conversion regions;
   a plurality of lenses on the plurality of photoelectric conversion regions;
   a light-impeding layer extending between the plurality of photoelectric conversion regions and the plurality of lenses, the light-impeding layer comprising:
      a first opening between a first one of the plurality of photoelectric conversion regions and the plurality of lenses; and
      a second opening between a second one of the plurality of photoelectric conversion regions and the plurality of lenses; and
   a planarization layer on the light-impeding layer,
   wherein the first opening overlaps the first one of the plurality of photoelectric conversion regions, and the first one of the plurality of photoelectric conversion regions is configured to generate charges in response to a direct light that is a portion of light incident on the plurality of lenses,
   wherein the plurality of lenses are arranged along a first direction,
   wherein a first one of the plurality of lenses is spaced apart from the light-impeding layer in a second direction that is perpendicular to the first direction,
   wherein the direct light passes through the first opening with an incident angle of about 0° to about 15°,
   wherein a width of the first opening in the first direction is smaller than a distance between the first opening and the second opening in the first direction, and
   wherein the optical sensor is configured to be assembled with an organic light emitting diode such that the first one of the plurality of lenses is disposed between the first opening and the organic light emitting diode.

11. The optical sensor of claim 10,
wherein the first and second openings are circular when viewed in a plan view.

12. The optical sensor of claim 11,
wherein a center of the first one of the plurality of lenses in the first direction is vertically aligned with a center of the first opening in the first direction.

13. The optical sensor of claim 12,
wherein a shortest distance between the first one of the plurality of lenses and the light-impeding layer in the second direction is equal to or less than a width of the first one of the plurality of lenses in the first direction.

14. The optical sensor of claim 13,
wherein a ratio of the width of the first opening in the first direction to the width of the first one of the plurality of lenses in the first direction is greater than 0 and less than 0.7.

15. The optical sensor of claim 14,
wherein the ratio of the width of the first opening in the first direction to the width of the first one of the plurality of lenses in the first direction is greater than 1:3.

16. The optical sensor of claim 15,
wherein the plurality of lenses directly contact the planarization layer.

17. The optical sensor of claim 16 further comprising an isolation pattern between the first one of the plurality of photoelectric conversion regions and the second one of the plurality of photoelectric conversion regions, and
wherein the isolation pattern is under the first and second openings.

18. The optical sensor of claim 17,
wherein a width of the isolation pattern in the first direction is smaller than the distance between the first opening and the second opening in the first direction.

* * * * *